(12) United States Patent  
Inukai

(10) Patent No.: US 7,702,147 B2  
(45) Date of Patent: Apr. 20, 2010

(54) IMAGE READING APPARATUS FOR PROCESSING COLOR COMPONENTS IN SEQUENCE

(75) Inventor: Yoshihiro Inukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 999 days.

(21) Appl. No.: 11/441,186

(22) Filed: May 26, 2006

(65) Prior Publication Data

US 2006/0274389 A1 Dec. 7, 2006

(30) Foreign Application Priority Data

Jun. 2, 2005 (JP) .............................. 2005-162298  
May 11, 2006 (JP) .............................. 2006-132708

(51) Int. Cl.
*G06K 9/00* (2006.01)  
*G06K 9/54* (2006.01)  
*H04N 1/46* (2006.01)

(52) U.S. Cl. ....................................... 382/162; 382/304

(58) Field of Classification Search ................. 382/162, 382/164, 165, 167, 181, 304; 358/505, 515, 358/518–521, 523, 525, 530; 345/589, 600–604; 348/803, E9.012; 399/179, 366  
See application file for complete search history.

(56) References Cited

U.S. PATENT DOCUMENTS 4,031,541 A * 6/1977 Arisawa et al. ............. 348/803

| 4,597,005 | A | * | 6/1986 | Baleshta et al. | 348/472 |
| 4,746,950 | A | * | 5/1988 | Mamizuka et al. | 399/179 |
| 5,194,945 | A | * | 3/1993 | Kadowaki et al. | 358/520 |
| 5,235,412 | A | * | 8/1993 | Boisvert et al. | 348/659 |
| 5,430,525 | A | * | 7/1995 | Ohta et al. | 399/366 |
| 5,726,779 | A | * | 3/1998 | Kadowaki et al. | 358/520 |
| 6,594,036 | B1 | * | 7/2003 | Wong et al. | 358/471 |
| 2006/0087707 | A1 | * | 4/2006 | Akaho | 358/518 |
| 2006/0274389 | A1 | * | 12/2006 | Inukai | 358/530 |

FOREIGN PATENT DOCUMENTS

| JP | 10-136154 | 5/1998 |
| JP | 2000/049699 | 2/2000 |
| JP | 2003-319150 | 11/2003 |

OTHER PUBLICATIONS

Office Action for corresponding Chinese Application No. 2000-049699 dated Nov. 9, 2007 and English translation thereof.

* cited by examiner

*Primary Examiner*—Amir Alavi  
(74) *Attorney, Agent, or Firm*—Harness, Dickey & Pierce, P.L.C.

(57) ABSTRACT

An image reading apparatus includes: an image signal generating part reading a plurality of color components of image data from an original, and generating corresponding image signals for the respective color components; an image processing part carrying out predetermined image processing on the image signal for each of the plurality of color components; and a signal processing part outputting in sequence for each color component the respective color components of the image signals thus generated by the image signal generating part to the image processing part.

13 Claims, 20 Drawing Sheets

IMAGE READING APPARATUS FOR PROCESSING COLOR COMPONENTS IN SEQUENCE

BACKGROUND OF THE INVENTION

1. Field of the Invention

The present invention relates to an image reading apparatus suitable as being applied to a scanner, a copier, a facsimile apparatus, a digital multi-function apparatus or such.

2. Description of the Related Art

As typical reading systems of a color image reading apparatus, a light source switching system and a color sensor system may be cited.

The light source switching system is such that light sources of three colors, i.e., R (red), G (green) and B (blue), and a single line sensor are provided. For each scanning line of the line sensor, the R, G and B light sources are switched. As a result, each line image data of RGB can be obtained.

The color sensor system is such that, R, G and B three sorts (pierces) of color line sensors and a white light source are provided. R, G and B are read simultaneously for one scanning line on each line sensor (the same time for the respective line sensors).

In the light source switching system, the single line sensor is shared for the line image data in the RGB respective colors in a time sharing manner. Accordingly, a reading speed is relatively slow. At the same time, since only a single channel of image data serially output by the single line sensor is processed, the circuit configuration can be simplified (see Japanese Laid-open Patent Applications Nos. 2003-319150 and 10-136154). Throughout the specification, 'serially outputting' means that image data is output in line units for each color in sequence.

On the other hand, in the color sensor system, serial image data is output in parallel from respective channels of the three single color line sensors for R, G and B. Accordingly, the reading speed can be made relatively higher. At the same time, only a single image processing circuit is not sufficient, and three image processing circuits are required for simultaneously processing the serial image data from the respective channels in parallel. Accordingly, the costs may rise.

SUMMARY OF THE INVENTION

The present invention has been devised in consideration of the above-mentioned situation, and, an object of the present invention is to provide an image reading apparatus in which a trade-off between an increase in the processing speed and the cost saving can be appropriately taken such that, serial image data provided by respective single color image sensors corresponding to the respective color components output in parallel simultaneously in a plurality of channels in the color sensor system can be processed in a time sharing manner by a single series of image processing circuit according to the light source switching system.

In order to achieve the object, an image signal generating part reading a plurality of color components of image data from an original in parallel, and generating corresponding image signals for the respective color components; an image processing part carrying out predetermined image processing on the image signal for each of the plurality of color components, one by one in sequence; and a signal processing part outputting, one by one in sequence for each color component, the respective color components of the image signals thus generated by the image signal generating part, to the image processing part, are provided.

According to the present invention, high speed reading is ensured since the image signal generating part reads the plurality of color components of image data from an original in parallel.

Further, to the image processing part which processes the image data for each of the plurality of color components one by one in sequence, the signal processing part outputs the image signal of each color component of the plurality of color components, which is originally read in parallel by the image signal generating part, one by one in sequence. Accordingly, the image processing part should have a configuration which can process the image data for each single color component every time. As a result, as the image processing part, a configuration only for a single color component is required. Thus, the product costs can be effectively reduced.

Other objects and further features of the present invention will become more apparent from the following detailed description when read in conjunction with the accompanying drawings:

DESCRIPTION OF THE PREFERRED EMBODIMENT

An image reading apparatus according to an embodiment of the present invention has a color line sensor including a plurality of single-color line sensors, corresponding to a plurality of color components; an image processing part carrying out predetermined image processing on the input each color component serial line image data in a time sharing manner of a single channel, and outputting the processed result in a time sharing manner; a data converting part disposing the respective color component line image data of the plurality of channels, which is parallelly and simultaneously output as a result of being read from a reading target by means of the respective single-color line sensors, so that the respective color component line image data is disposed in serially output image data in a time sharing manner.

The plurality of single color image sensors of the color image sensor corresponding to the respective color components output the single color line image data corresponding to the color components of red, green and blue.

A storage time of the color image sensor corresponds to an integer number of times of a period of a main scanning synchronization signal which is used as a reference signal for processing the time shared line image data in the image processing part.

The above-mentioned integer number is three.

The above-mentioned data converting part may output the single color component line image data for each line according to a signal designating the output color.

The above-mentioned data converting part may output the single color component line image data for each line in a predetermined sequence during a valid period designated by a signal designating valid lines of the image data.

The above-mentioned data converting part may output the single color component line image data for each line in a predetermined sequence according to a signal designating a beginning of valid lines of the image data and a signal designating the number of the valid lines.

In this configuration according to the embodiment of the present invention, the respective color components parallelly output from the color image sensor are converted into a color line-sequential form for each color. Thus, it is possible to apply the image processing circuit configured to process image data in a time sharing manner, such as that used in the color image reading apparatus according to the light source switching system. As a result, both an increase of the reading speed thanks to the respective color component parallel reading and outputting by means of the color image sensor according to the color sensor system, and a cost reduction resulting from the configuration in which the single channel image processing circuit is sufficient according to the light source switching system, are achieved at the same time. Thus a very useful image reading apparatus can be provided.

The embodiment of the present invention is described in detail with reference to figures.

Figure 1:
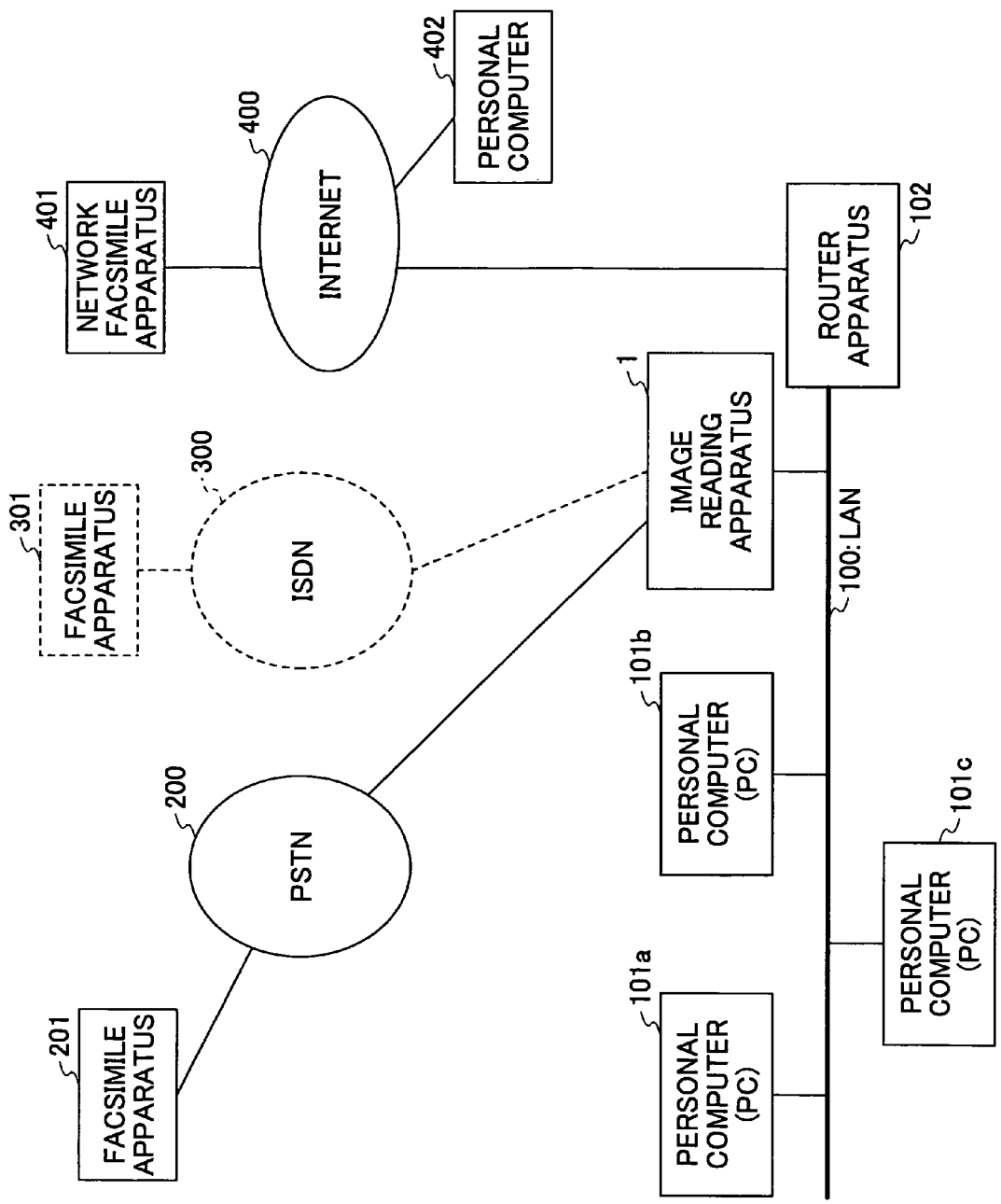
FIG. 1 shows a system configuration including an image reading apparatus in an embodiment of the present invention.

FIG. 1 shows a system configuration of a system including an image reading apparatus 1 according to the embodiment of the present invention.

In FIG. 1, the image reading apparatus 1 can transmit/receive image data to/from a facsimile apparatus 201 on PSTN 200 via the PSTN 200. The image reading apparatus 1 also can transmit/receive image data to/from a facsimile apparatus 301 on ISDN 300 if having an interface therefor (in the embodiment, the interface is not included). Further, the image reading apparatus 1 is connected to LAN 100, is connected to the Internet 400 via a router apparatus 102, which carries out packet switching, can carry out transmission/reception of image data by means of an electronic mail with a personal computer 402 on the Internet 400, and can carry out transmission/reception of image data with a network facsimile apparatus 401 on the Internet 400 via an electronic mail or real-time network facsimile communication based on ITU-T recommendation. Further, the reading apparatus 1 can communicate image data with personal computer (PC) 101a, 101b, 101c or such on the LAN 100.

That is, the image reading apparatus 1 has, in a multi-function manner, various functions as a scanner apparatus for the common facsimile apparatus, network facsimile apparatus, PC 101a or such, via the pubic circuit; a printer apparatus for the PC 101a or such; a copier, or such.

Figure 2:
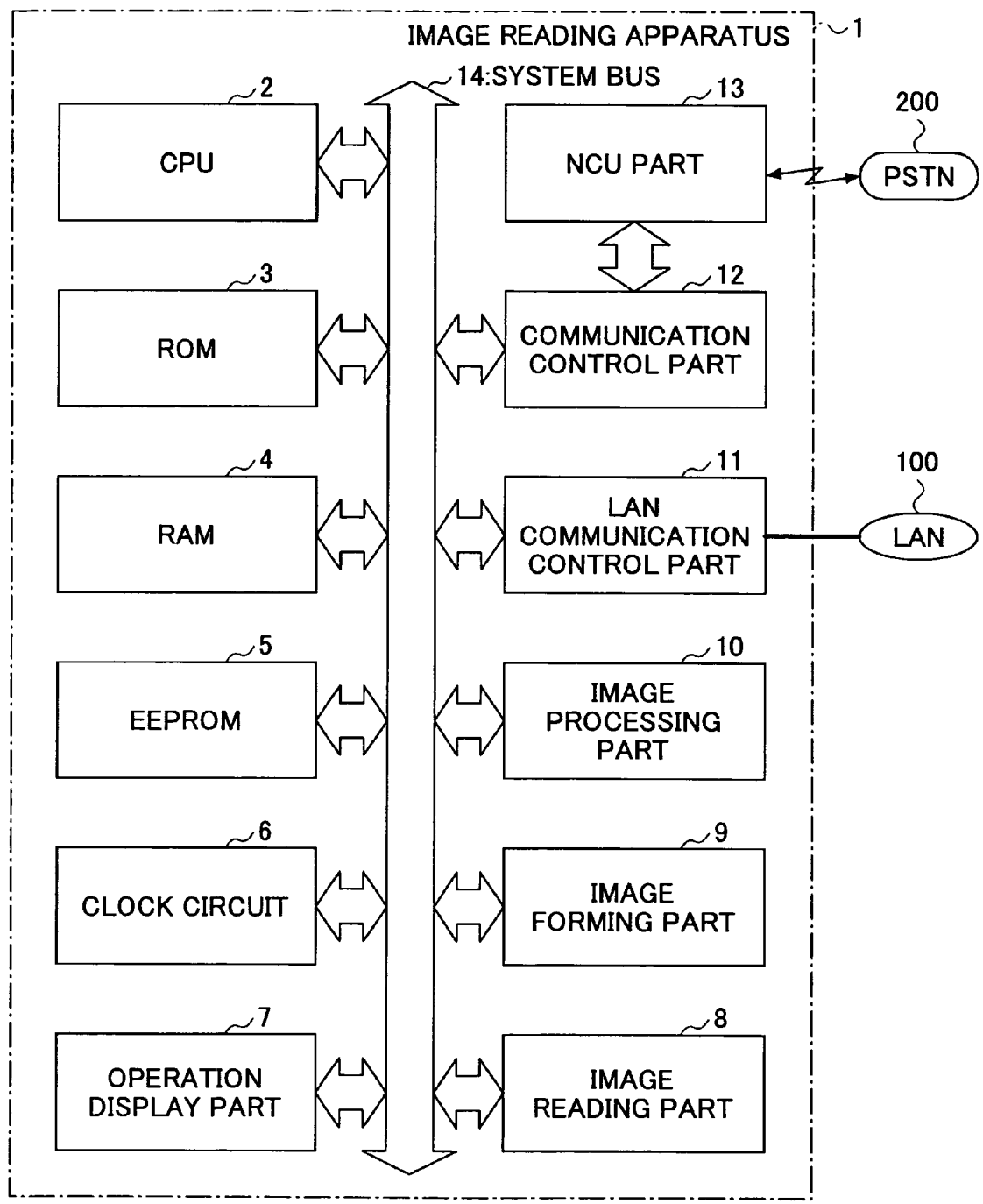
FIG. 2 shows a block configuration of the image reading apparatus in the embodiment of the present invention.

FIG. 2 shows a block configuration of the image reading apparatus 1.

In FIG. 2, CPU 2 uses a RAM 4 as a working area, controls respective parts of the apparatus based on a control program written in a ROM 3, carries out various sorts of data processing, carries out protocol control, or such.

The ROM 3 stores the control program used by the CPU 2 to control the respective parts of the apparatus, and various sorts of required data.

The RAM 4 is used as the working area as mentioned above by the CPU 2.

An EEPROM (electrically erasable and programmable ROM) 5 stores various sorts of information required for the apparatus operation, has a function of holding stored contents even in a state in which the power supply to the apparatus is turned off, and, may be replaced by a SRAM (static RAM) with a backup by a battery or a magnetic disk drive.

A clock circuit 6 always measures the current date/time. The CPU 2 reads from the clock circuit 6 via a system bus 14 to obtain the current date/time.

An operation and display part 7 has various sorts of operation keys for inputting operation instructions by a user, and has a display device displaying to the user the apparatus operation state, and various sorts of messages.

An image reading part 8 reads an original to obtain image data. A configuration thereof is described later in detail.

An image forming part 9 prints out image data on recording paper, and may have a well-known configuration of a common printer.

An image processing part 10 carries out various sorts of processing concerning image data handled by the image reading apparatus 1, such as coding/compressing processing on raw image data, decoding/decompressing the coded/compressed image data, processing of adding supplemental information such as a character string of transmission date/time, reception date/time, or such.

A LAN communication control part 11 is a so-called NIC (network interface card), is connected to the LAN 100, communicates TCP/IP protocol on the LAN protocol by the CPU 2, and thus, enables communication of various sorts of information by means of a protocol of a higher level.

A communication control part 12 is connected with the PSTN 200 via an NCU part 13, and carries out communication control for another communication terminal. The communication control part 12 controls the NCU part 13, and detects a ringing voltage pulse detected by the NCU part 13, detects a DTMF signal, and carries out calling for transmission. Further, the communication control part 12 has a modem, demodulates modulated data received from the other communication terminal, or, contrary, modulates and transmits transmission data. Specifically, it has respective modem functions of V.17, V.33, V.34, V.29 and V.27ter which are low speed modem function for a G3 facsimile control signal based on ITU-T recommendation T.30 and a high speed modem function mainly for document image data.

The NCU part 13 is connected to the PSTN 200, and carries out circuit connection, calling signal (ringing) detection, or such.

The system bus 14 includes a data bus, an address bus, a control bus, an interruption signal line and so fourth for the above-mentioned respective parts to communication data thereamong.

As being configured as described above, the image reading apparatus 1 acts as a scanner apparatus, as a transmission side of a facsimile apparatus, or a copier, to carry out reading an original image. Actually, the image reading part 8 is a part which carries out this process.

Before describing a hybrid type of an image reading part as a best mode of carrying out the present invention applied as the image reading part 8, the light source switching system and the color sensor system in the related arts are described first.

Figure 3:
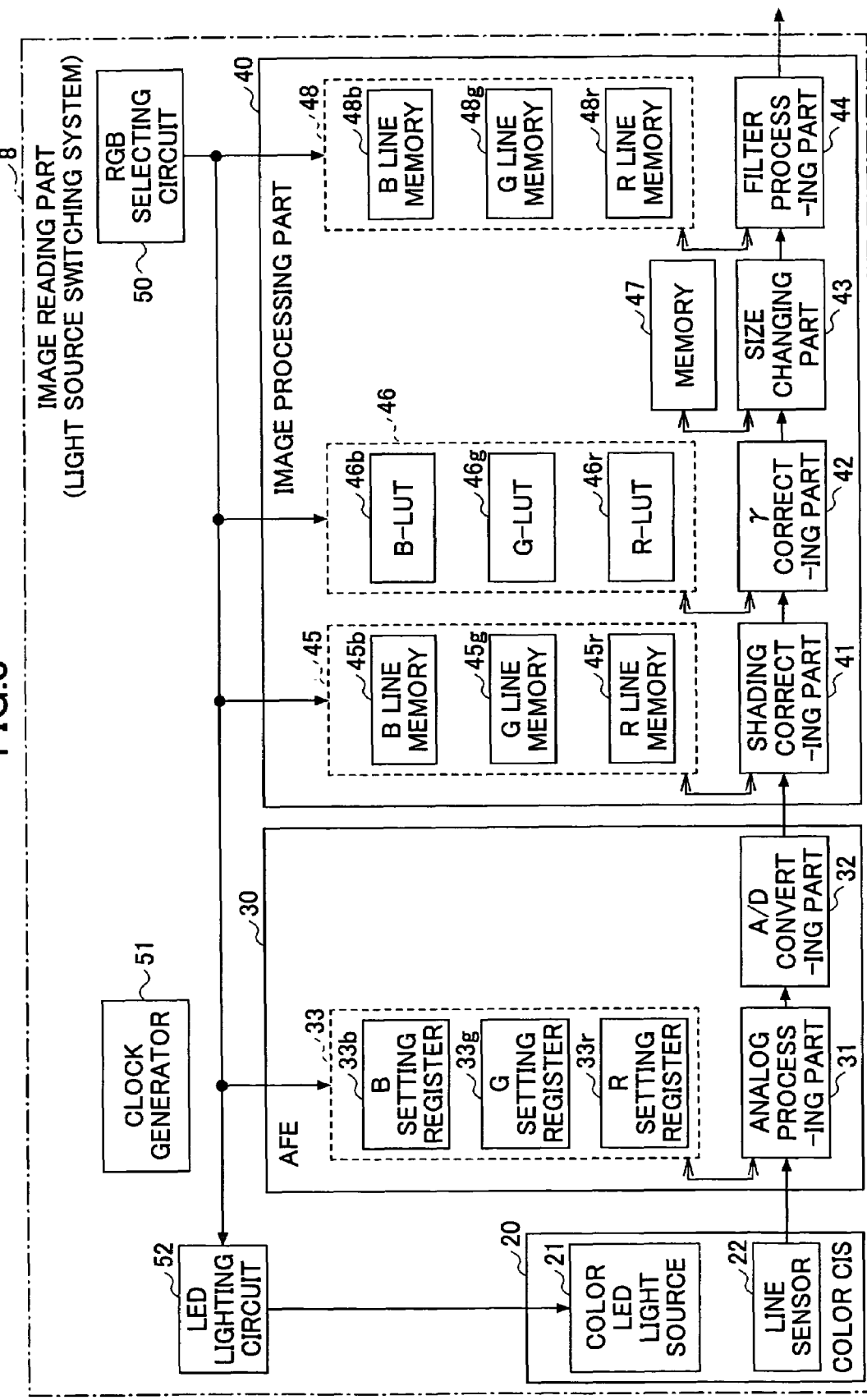
FIG. 3 shows a configuration of an image reading part in a light source switching system.

FIG. 3 shows an image reading part 8 in the light source switching system in the related art.

In FIG. 3, the image reading part 8 in the related art has a color CIS (contact type image sensor) 20, an analog front end (AFE) 30, an image processing part 40, an RGB selecting circuit 50, a clock generator 51 and an LED selecting circuit 52.

The clock generator 51 provides various sorts of clock signals such as a line synchronization signal, a pixel synchronization signal, and so forth which define operation timing of respective parts of the image reading part 8, and provides them to the respective parts. The RGB selecting circuit 50 provides a signal for selecting any one of RGB color components to the respective parts for obtaining the RGB respective color component line image data in sequence. Specifically, an LED lighting circuit 52 drives and lights the color LED of the color component designated by the RGB selecting circuit from among the respective color LED light sources corresponding to the respective color components of RGB of the color CIS 20. One of those included in a setting register group 33 of the AFE 30, i.e., a B setting register 33b, a G setting register 33g and an R setting register 33r, designated by the RGB selecting circuit 50, is read by an analog signal processing circuit 31. One of a B line memory 45b, a G line memory 45g and a R line memory 45r of a line memory group 45 of the image processing part 40, designated by the RGB selecting circuit 50, is read by a shading correction part 41. One of a B-LUT 46b, a G-LUT 46g and an R-LUT 46r of a loop up table (LUT) group 46 of the image processing part 40, designated by the RGB selecting circuit 50, is read by a γ correction part 52. One of a B line memory 48b, a G line memory 48g and an R line memory 48r of a line memory group 48 of the image processing part 40, designated by the RGB selecting circuit 50, is read by a filter processing part 44.

The line sensors of the color CIS 20 output single lines of serial image signals in a line sequential manner. Which color component of color LED light source 21 is lit during serial image signal reading (during charge storage), output in the line sequential manner, determines which color component each line serial image signal corresponds to.

The color LED light source 21 is lit in a switching manner in the order of R, G and then B, by means of an LED lighting circuit controlled by the RGB selecting circuit 50. Accordingly, the line image signal serially output by the line sensor 22 includes one corresponding to each of RGB color components in a line sequential manner, and thus, the single line of color line image signal is configured by the line image signals of the three successive RGB respective color components.

The respective color component line image signal output as a serial image signal of RGBRGBRGB . . . in the line sequential manner from the line sensor 22 is processed in a time sharing manner in line units as a single series of the serial image signal. Accordingly, only a single set of subsequent processing circuit in the AFE 30 and the image processing part 40 is sufficient therefor.

That is, the line image signal output serially in the line sequential manner from the line sensor 22 undergoes signal processing in an analog stage by means of the analog processing part 31 of the AFE 30. In this case, LED light emitting intensity and light emitting intensity distribution along a line direction of the line sensor 22 differ among the LEDs of the respective color LED light sources 21 corresponding to the respective RGB color components. Accordingly, the setting register from among those in the setting register group 33 corresponding to the color component of the currently processed line is read by the analog processing part 31. Specifically, the analog processing part 30 carries out data sampling, offset adjustment and gain adjustment on the output signal from the line sensor 22 of the color CIS 20. The offset adjustment amount and the gain adjustment amount (parameters) are determined with reference to setting values stored in each of the RGB setting registers 33r, 33g and 33b.

The serial image signal thus processed by the analog processing part 31 is converted into a corresponding digital signal by means of an A/D converting part 32.

The line image data serially output from the A/D converting part 32 is input to the shading correcting circuit 41 of the image processing part 40 in sequence, and there, shading correction is carried out in such a manner that shading correcting data corresponding to the color component of the currently processed line is read from the respective one of the B line memory 45b, G line memory 45g and R line memory 45r. The shading correcting data is light emitting intensity distribution along the line direction of the line sensor 22 previously obtained when each color component LED is lit on a white reference plate and reflected light is read, and stored in the respective one of the B line memory 45b, G line memory 45g and R line memory 45r.

The serial image data having thus undergone the shading correction is then input to the γ correcting part 42 in sequence, and there, γ correcting data is read from the respective one of the B-LUT 46b, G-LUT 46g and R-LUT 46r, and γ correction is carried out. The γ correcting data is one previously set for correcting γ characteristics of the respective color component LEDs and is previously stored in the respective one of the B-LUT 46b, G-LUT 46g and R-LUT 46r.

The serial image data having undergone the γ correction is then input to the size changing part 43 in sequential, and there, with the use of a memory 47, main scanning direction size increase/reduction processing is carried out. Then, the thus-processed image data is input to the filter processing part 44. In the filter processing part 44, separately for each line of each of the respective color components RGB, filter processing such as smoothing, edge enhancement, or such, is carried out. At this time, the immediately preceding line, further preceding line, or more further preceding line are temporarily stored in the B line memory 48b, G line memory 48g and R line memory 48r, corresponding to the respective color components to be read for the filter processing. Also, sub-scan direction size change is carried out in the filter processing part 44 (see Japanese Laid-open Patent Application No. 2003-319150).

Thus, in the light source switching system, only the single channel, i.e., the single set of the analog processing part 31 through the filter processing part 44 is required for processing the image signal output by the line sensor 22. For the difference in the specific processing contents among the respective color components RGB, the above-mentioned registers, line memories and lookup tables are appropriately switched thereamong. Accordingly, cost reduction can be achieved effectively. However, the LEDs are switched thereamong, and reading is carried out for the single line color image data each time through the three-line successive reading. Accordingly, the reading speed of the LED light source switching manner in the color CIS limits the entire reading speed of the image reading apparatus, i.e., the data rate finally output from the filter processing part 44.

Figure 4:
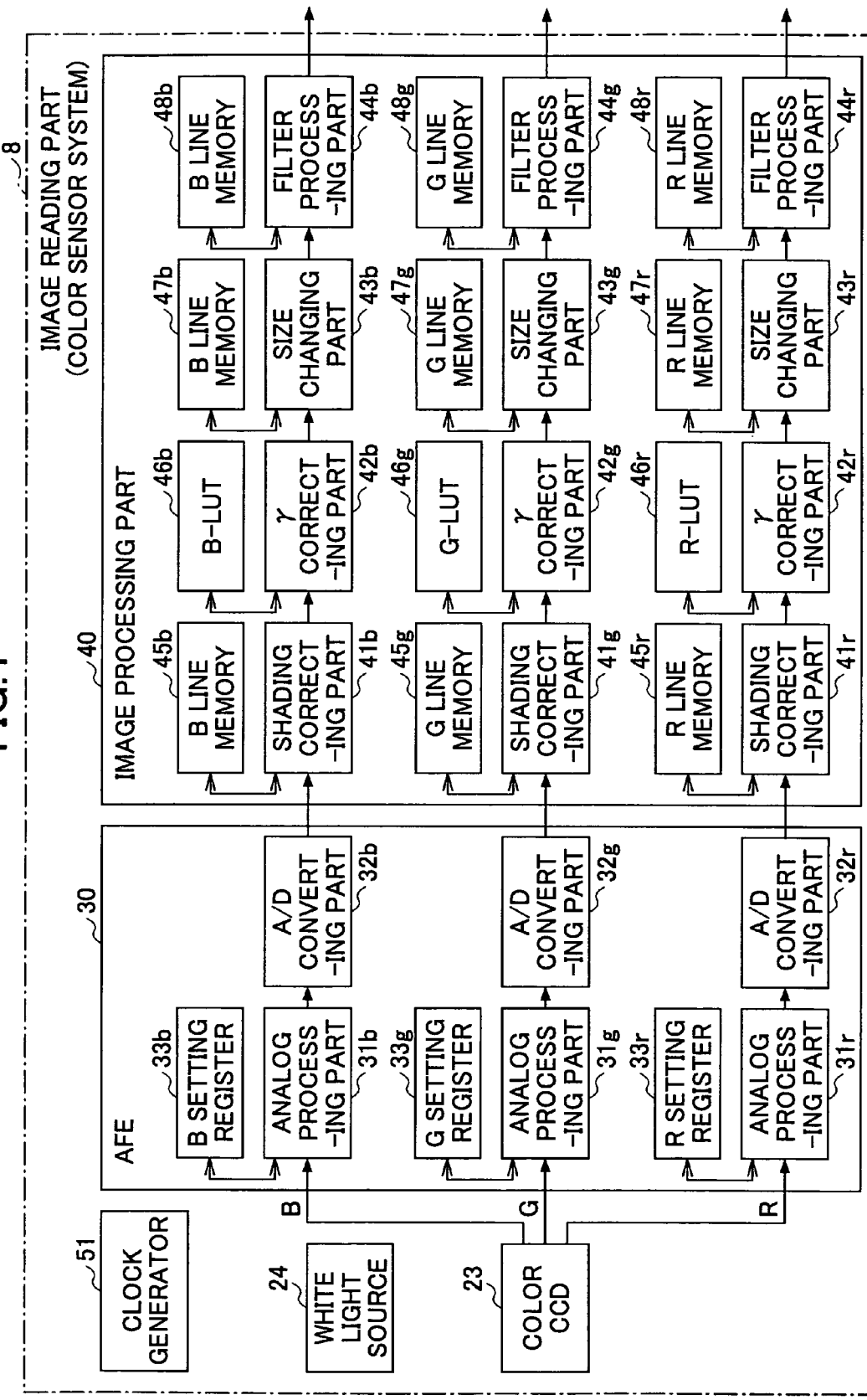
FIG. 4 shows a configuration of an image reading part in a color sensor system.

Next, an image reading part 8 in the color sensor system of FIG. 4 in the related art is described. In the configuration of the image reading part 8 of FIG. 4, the same parts as those of the configuration of FIG. 3 are given the same reference numerals, and duplicate description is omitted.

In FIG. 4, a color CCD 23 including 3 line image sensors provided with color filters corresponding to the respective color components of RGB carries out photoelectric conversion on reflected light from a reading target such as an original lit by a white light source 24, and serially outputs, simultaneously in parallel, line image signals respectively corresponding to the color components RGB. A clock generator 51 provides various sorts of clock signals such as a line synchronization clock signal, a pixel synchronization signal and so forth, defining operation timing, to respective parts of the image reading part 8.

The RGB respective line image signals thus output in parallel simultaneously from the color CCD 23 are processed, in parallel simultaneously, by an AFE 30 and respective image processing channels of an image processing part 45b.

For example, the B component line image signal from the color CCD 23 is input to an analog processing part 31b (corresponding to the analog processing part 31 of FIG. 3), undergoes analog signal processing with reference to a B setting resistor 33b. Then the line image signal serially output therefrom is input to an A/D converting part 23b, is converted into corresponding serial line image data in sequence, and is input to a shading correcting part 41b. There, based on shading correcting data previously stored in a B line memory 45b, shading correction is carried out, and is input to a γ correcting part 42b. The γ correcting part 42b carries out γ correction based on correcting data previously stored in a B-LUT 46b. The resulting data is then input to a size changing part 43b, which then carries out size changing processing in a main scanning direction and a sub-scanning direction with the use of a B line memory 47b as a working area. The resulting data is then input to a filter processing part 44b, which then carries out filter processing with reference to a B line memory 48b. Thus, the resulting data is serially output as B color component line image data from the image processing part 40.

In the same manner, the G and R respective color component line image signals are processed by the respective image processing channels. Finally, from the image processing part 40, the resulting data is output as the respective color component line image data together with the B color component line image data, in parallel simultaneously.

Thus, in the image reading processing in the color sensor system, one line of color image signal (a collection of the RGB respective color component monochrome image signals) is obtained from the color CCD 23 in parallel simultaneously. Also, since separate image processing channels (each including various sorts of image processing elements) are provided for the RGB respective color components for the subsequent image signal processing, high speed color image reading is achieved. However, since the RGB respective color component line image signals are processed in parallel simultaneously, the plurality of channels of image processing systems are required, which may result in a cost rise.

Figure 5:
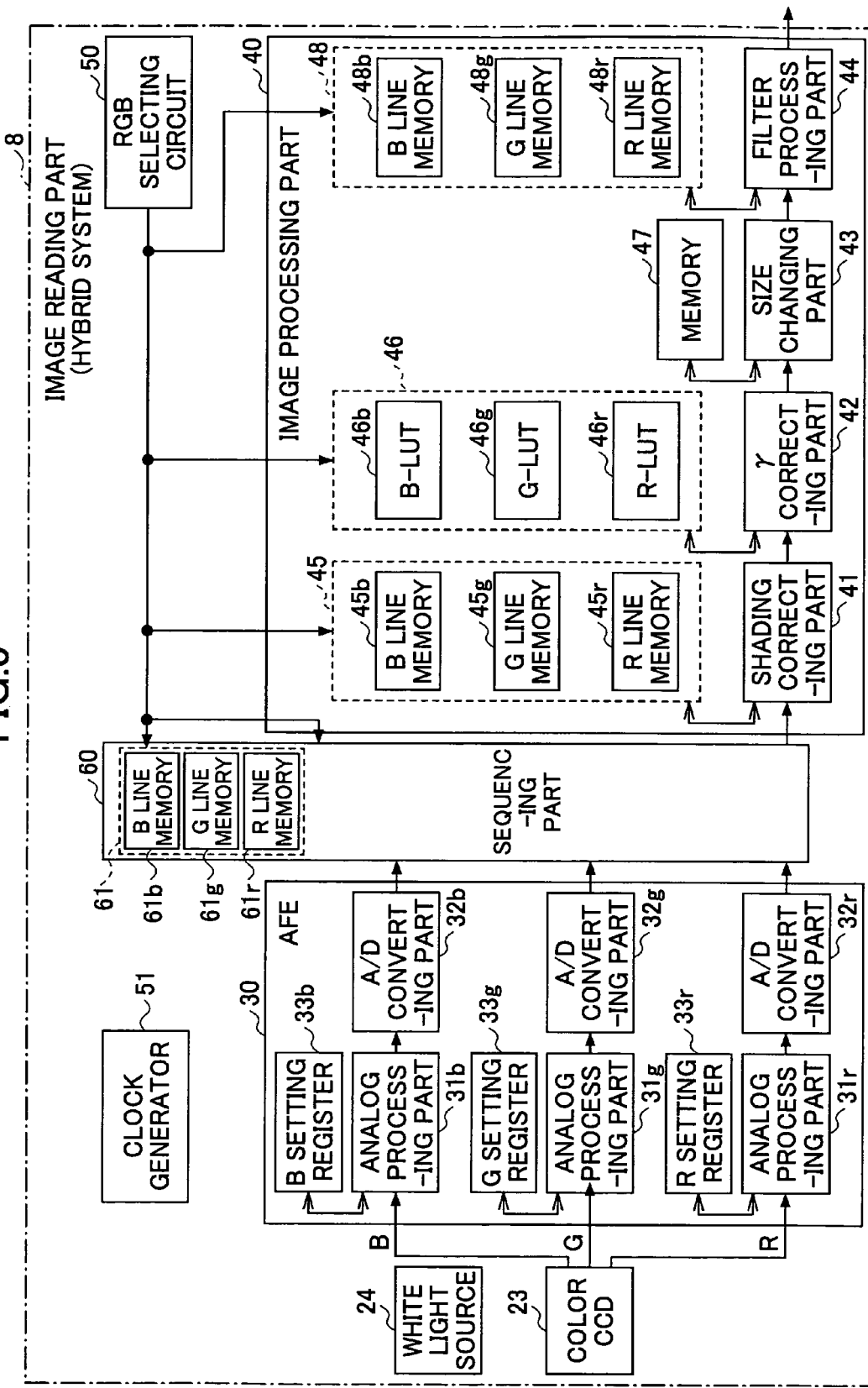
FIG. 5 shows a configuration of an image reading part in a hybrid type in the embodiment of the present invention.

In order to take an appropriate tradeoff between cost reduction thanks to only one set of image processing channel being required and high processing speed reading thanks to the color CCD 23 in the color sensor system outputting the RGB respective color component line image signal in parallel simultaneously, a hybrid type of image reading part 8 shown in FIG. 5 is provided in a best mode of carrying out the present invention.

A clock generator 51, a white light source 24, a color CCD 23 and an AFE 30 in the image reading part 8 in the hybrid type of FIG. 5 are the same as those of the color sensor system shown in FIG. 4. Further, an image processing part 40 of FIG. 5 has the same configuration as that of the light source switching system of FIG. 3, and there, according to a selecting instruction from an RGB selecting circuit 50, RGB respective lines are processed in a time sharing manner.

However, the RGB respective sets of line image signals output in parallel simultaneously from the color CCD 23, processed by the AFE 30 in parallel simultaneously and serially output in parallel simultaneously, could not be handled by the image processing part 40 which has only a single set of image processing channel, as they were.

In order to solve this problem, in the image reading part 8 in the hybrid type of FIG. 5 in the embodiment of the present invention, a sequencing part 60 is provided to input, to a shading correcting part 41 of the image processing part 40, after converting the RGB respective color component line image data serially output by the A/D converting parts 32b, 32g and 32r of the AFE 30 in three separate series in parallel simultaneously, into a single series of serial data. The sequencing part 60 refers to a line memory selected according to an RGB selecting circuit 50 from among a B line memory 61b, a G line memory 61g and an R line memory 61r.

Figure 6:
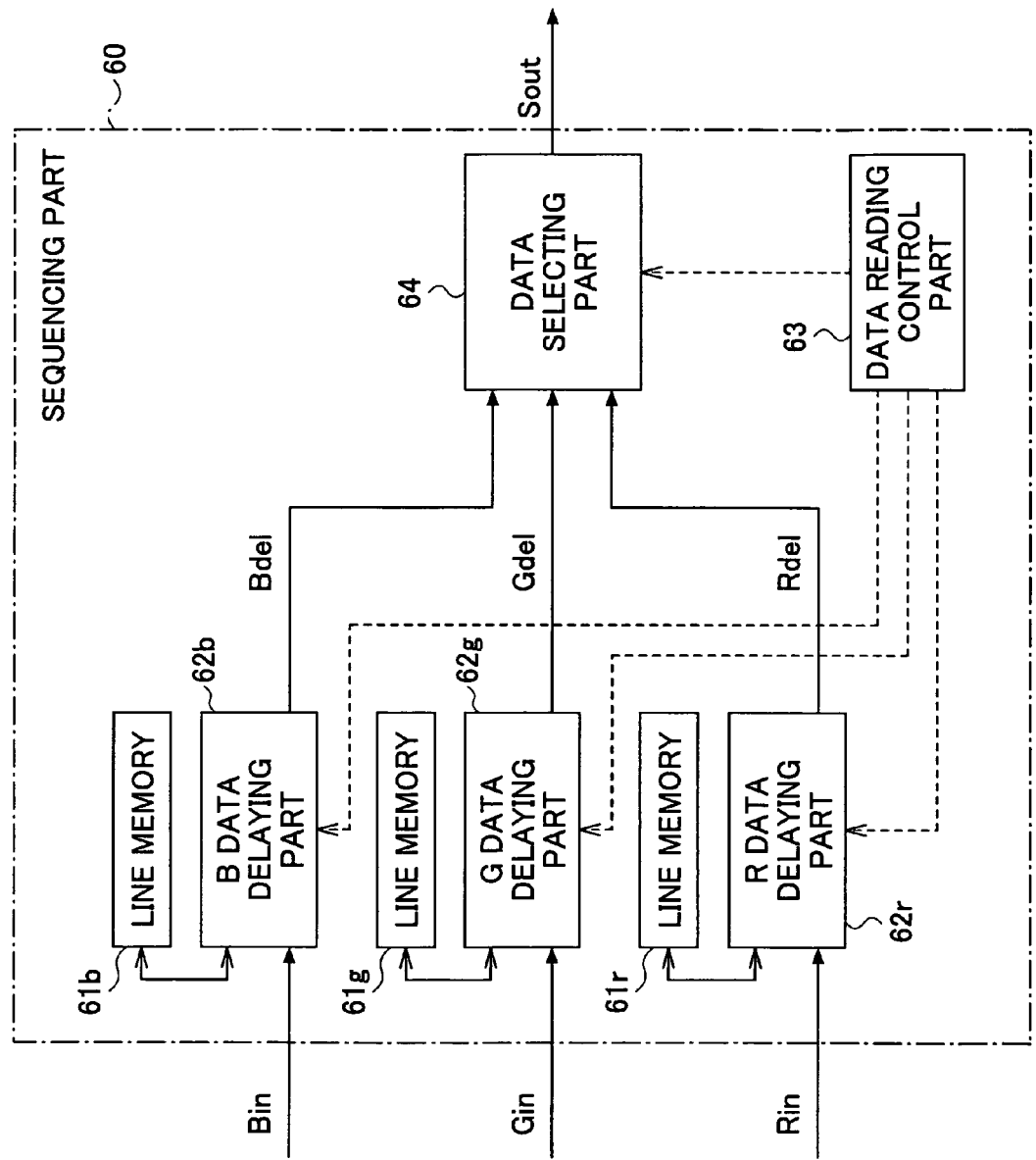
FIG. 6 shows a specific configuration of a sequencing part.

The sequencing part 60 specifically is configured as shown in FIG. 6. It is noted that, in FIG. 6, the respective line memories, included in a line memory group 61 shown in FIG. 5, are shown as if they are included in the sequencing part 60 for the purpose of simplification of illustration.

The sequencing part 60 has a function of embedding the RGB three parallel series of line image data input in parallel simultaneously, into a single successive series of serial image data in a time sharing manner. The sequencing part 60 includes a data selecting part 64 selectively outputting any one of delayed line image data Bdel, Gdel and Rdel in the RGB respective successive series, which are first output from RGB respective separate series of data delaying parts 62r, 62g and 62b, and a data reading control part 63 controlling the data selecting part 64.

The RGB respective data delaying parts 62r, 62g and 62b store the RGB respective output data from the AFE 30 in respective line memories 61r, 62g and 61b corresponding to the respective color components, temporarily. The data selecting part 64 repetitively carries out operation of selecting any one of the output data from the RGB respective data delaying parts 62r, 62g and 62b, for the RGB respective color components. Thereby, the output signal is then output to the image processing part 40 of FIG. 5, i.e., the shading correcting part 41 thereof, as a single successive series of serial image data output Sout. That is, the data selecting part 64 serially outputs the respective color component image data from the line memories 61b, 61g and 61r through the data delaying parts 62r, 62g and 62b.

The data reading control part 63 generates a signal for controlling reading timing from the RGB respective data delaying parts 62r, 62g and 62b and a signal for controlling selection of the input image data in the data selecting part 64.

As described above, in the sequencing part 60, the input data is temporarily stored in the line memories 61b, 61g and 61r via the corresponding data delaying parts 62r, 62g and 62b, then the stored data is read by the corresponding data delaying parts 62r, 62g and 62b in sequence upon processing of the corresponding color component, and is output to the data selecting part 64. In an alternate manner as will be described later, the respective color component image data is read from the line memories 62r, 64g and 62b in parallel simultaneously, and then, the data selecting part 64 selects an appropriate one thereof in sequence to output.

Figure 7:
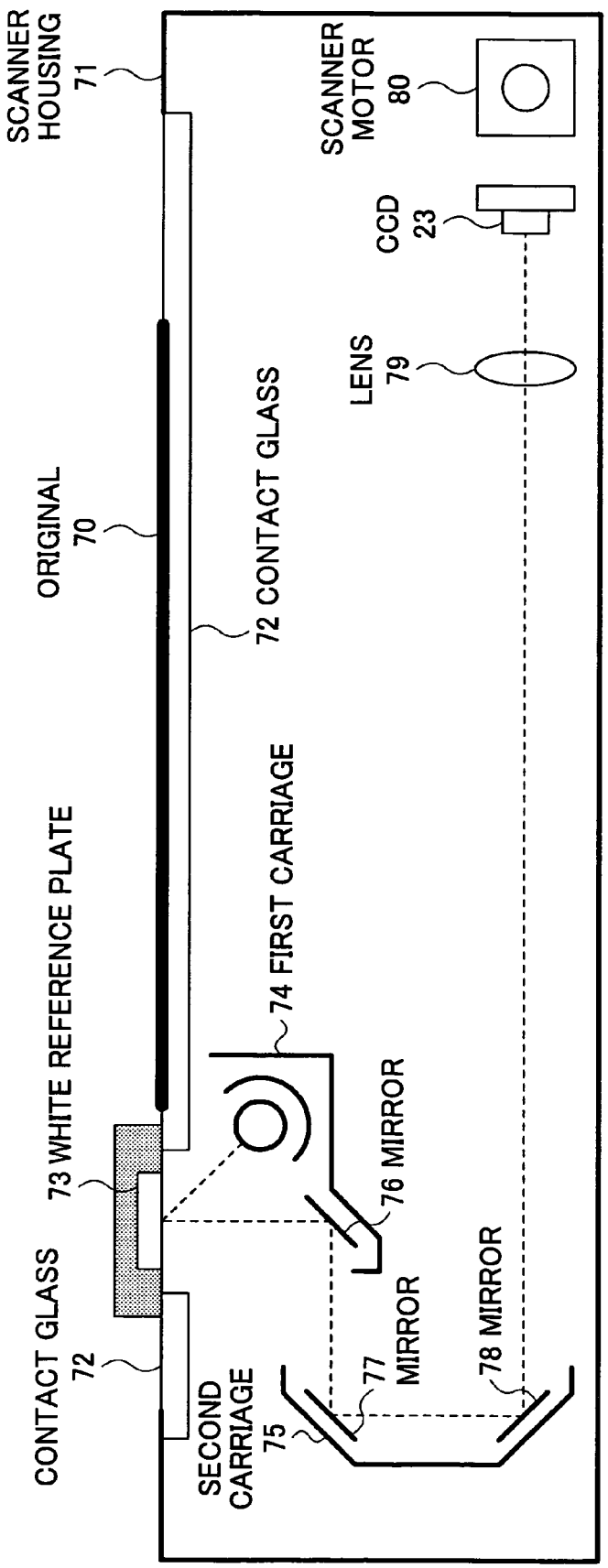
FIG. 7 diagrammatically shows an image reading mechanism concerning the image reading part of FIG. 5.

FIG. 7 shows an image reading mechanism concerning the image reading part 8 of FIG. 5 in the embodiment of the present invention, diagrammatically.

A CCD 23 of FIG. 7 corresponds to the color CCD 23 of FIG. 5, and a white light source 24 of FIG. 7 corresponds to the white light source 24 of FIG. 5.

In FIG. 7, an original 70 placed on a contact glass 72 on a top of a scanner housing 71 is read by the CCD 23 disposed in the scanner housing, through the contact glass 72.

Specifically, the original surface (bottom side facing the contact glass 72) of the original 70 is lit by the light source 24 mounted on a first carriage 74 moved in the sub-scanning direction driven by a scanner motor 80, reflected light therefrom is then reflected by a mirror 76 mounted on the first carriage 74, then reflected by mirrors 77 and 78 mounted on a second carriage 75, condensed by a lens 79, and forms an image on the CCD 23. The CCD 23 carries out photoelectric conversion on the incident light, and thus, converts the original surface into an image signal in main scanning line units.

In this case, moving speeds of the first carriage 74 and the second carriage 75 parallelly moving in the sub-scanning direction with respect to the original 70 are set such that a ratio of the moving speeds of the first carried 74 and the second carriage 75 is set as 2:1. Thereby, a distance of light traveling from the original and the CCD 23 can be kept constant.

The white reference plate 73 is used as a reading target as a while level reference when the shading correcting data is obtained, as mentioned above.

Figure 9:
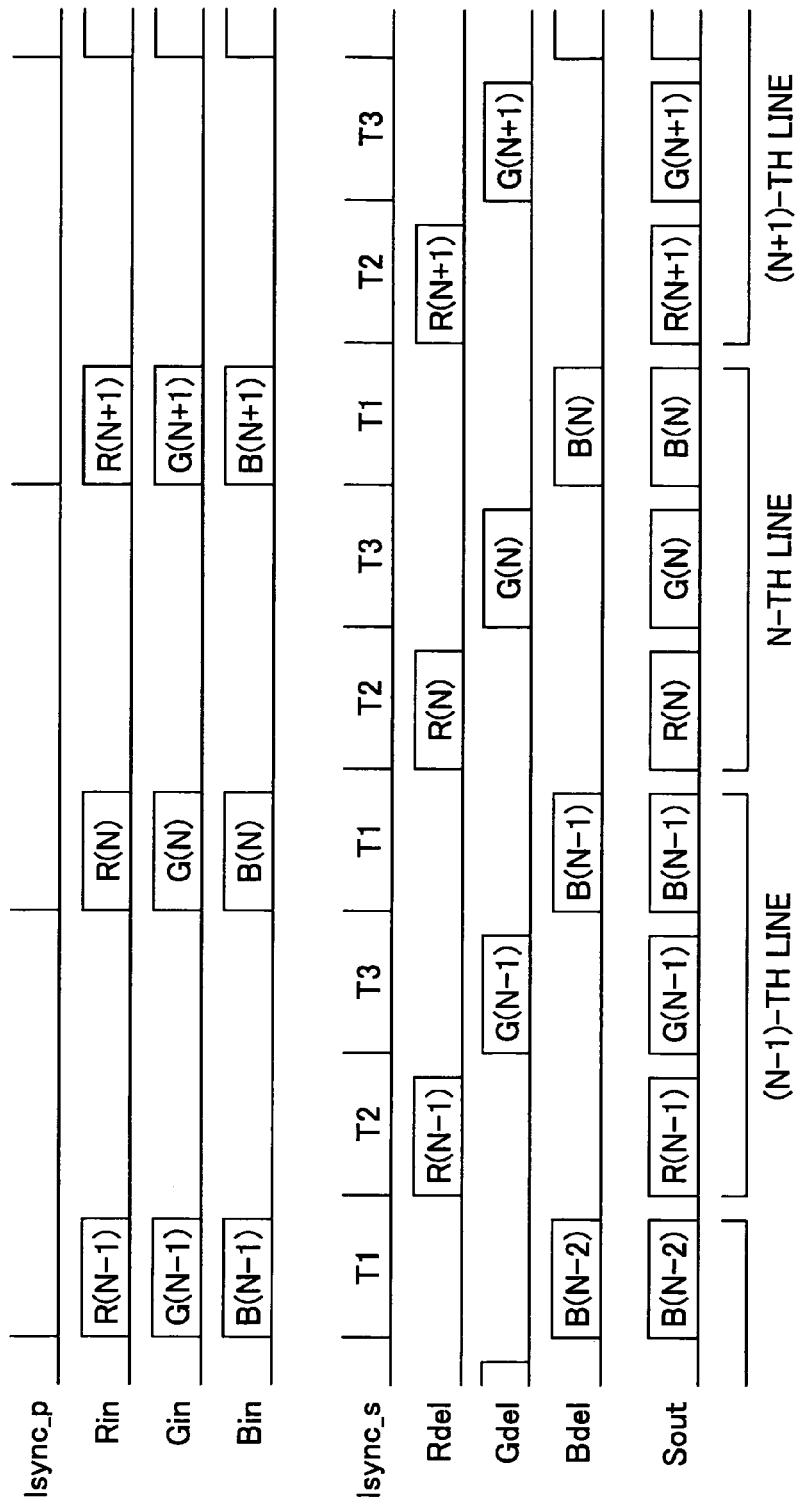
FIG. 9 shows a timing chart illustrating operation of the sequencing part of FIG. 6.

FIG. 9 shows timing of operation of the sequencing part 60 of FIG. 5.

In FIG. 9, lsync_p and lsync_s denote reps main scanning synchronization signals applied before and after the RGB respective data delaying parts 62r, 62g and 62b. lsync_p has a period trice a period of lsync_s as shown. In order to output the RGB three color component image data to the subsequent circuit for each color component in sequence, the main scanning synchronization signal lsync_s is made thrice in the frequency, of the main scanning synchronization signal lsync_p. Thus, the frequency of the main scanning synchronization signal is made thrice between before and after the data delaying parts 62r, 62g and 62b.

It is noted that the main scanning synchronization signal corresponds to a timing control signal controlling timing of the image signal.

The synchronization signals thus having the different frequencies (periods) are provided by the clock generator 51 (synchronization signal generating circuit) having a well-known frequency multiplication function.

Rin, Gin and Bin denote the serial image data output from the respective A/D converting parts 32r, 32g and 32b. Rdel, Gdel and Bdel denote the output image data of the data delaying parts 62r, 62g and 62b, respectively. Sout denotes the serial image data output from the data selecting part 64 to the shading correcting part 41 of the image processing part 40 of FIG. 5. The line image data Rin, Gin and Bin serially output in parallel simultaneously from the AFE 30 in synchronization with lsync_p, or every period thereof, is temporarily stored in the line memories 61r, 61g and 61b via the data delaying parts 62r, 62g and 62b. Then, in synchronization with lsync_s, or every period thereof, the line image data is serially output in sequence from the respective line memories 61r, 61g and 61b. Since lsync_p is thrice lsync_s in the period, a charge storage time in the CCD 23 can be ensured thrice lsync_s.

The line image data output from the respective line memories 61r, 61g and 61b is only for a single color component per period of lsync_s. The data selecting part 64 takes the one of Rdel, Gdel and Bdel currently input thereto, and outputs as Sout. Thereby, the RGB parallel image data from the AFE 30 is converted into the line sequential image data.

In the above description, an example of the order of R, G and then B is mentioned, However, the order in the line sequential signal can be determined in any different manner.

Figure 8:
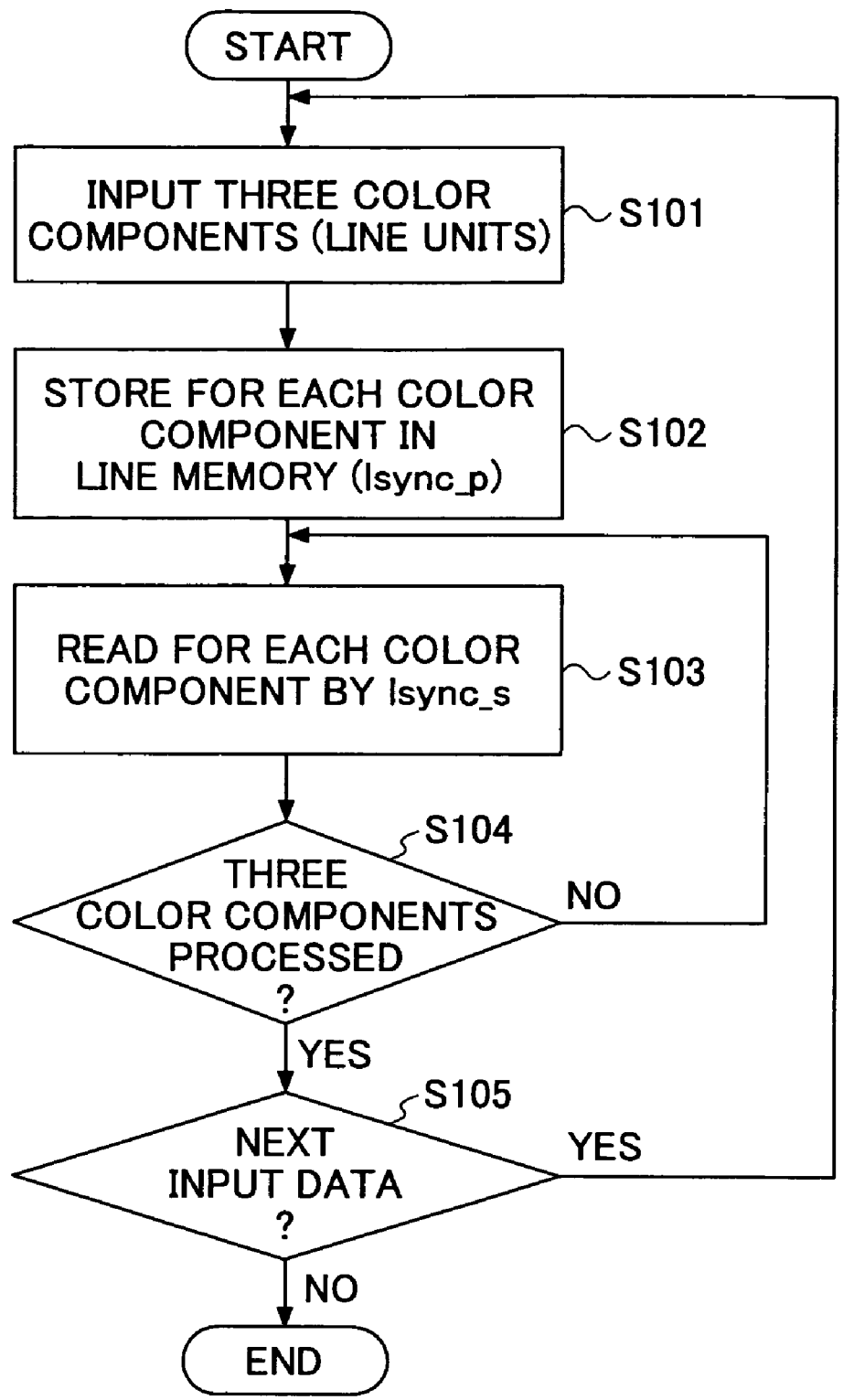
FIG. 8 shows a flow chart illustrating operation of the sequencing part of FIG. 6.

FIG. 8 shows a flow chart illustrating an operation flow of the sequencing part 60.

In Step S101, the RGB three color component image data is input in synchronization with the main scanning synchronization signal lsync_p. In Step S102, the image data is then stored in the respective line memories 61r, 61g and 61b by the data delaying parts 62r, 62g and 62b, respectively.

In Step S103, the image data of each of the respective color components stored in the line memories 61r, 61g and 61b is then read in synchronization with the thrice main scanning synchronization signal lsync_s from the corresponding one of the line memories 61r, 61g and 61b, in sequence. This operation is repeated for the RGB color components (Yes in Step S104), and then, the same processing (Steps S101 through S104) is carried out on next input image data.

As a result, as shown in FIG. 9, the respective color component image data input in parallel simultaneously is output in sequence every line every color component at the thrice rate.

Thus, in the embodiment of the present invention, the line image data for the RGB respective color components serially output in the three series in parallel simultaneously from the color CCD 23 in the color sensor system is converted into a form in which, in the single series of serial image data, the RGB respective color component line image data is included in a time sharing manner. After that, the resulting image data is input to the image processing part 40 of FIG. 5 of the light source switching system. As a result, it is possible to achieve an appropriate tradeoff between cost reduction obtained thanks to only one set of image processing channel being required and high processing speed reading obtained thanks to the color CCD 23 in the color sensor system outputting the RGB respective color component line image signal in parallel simultaneously, in the image reading processing.

Figure 10:
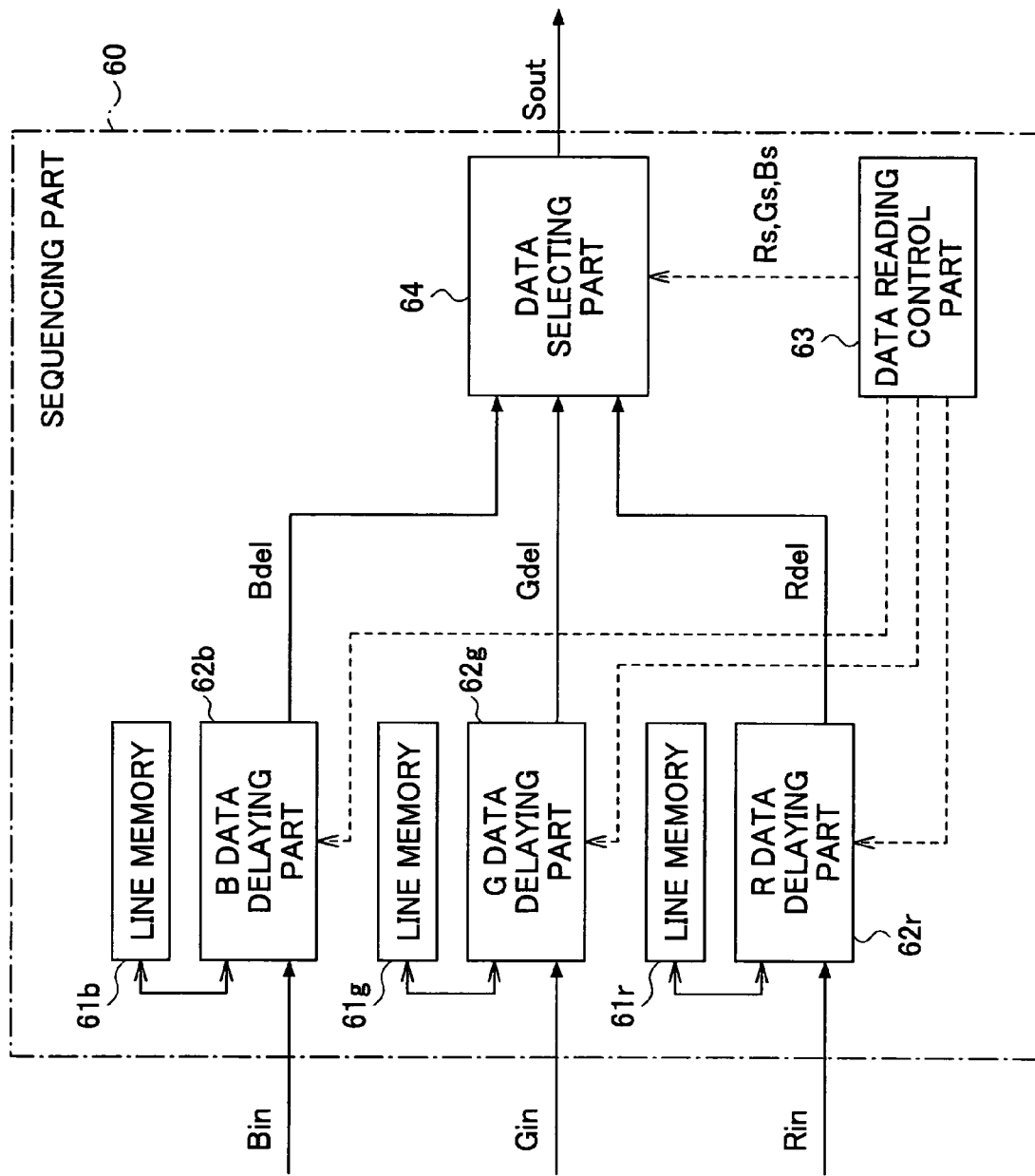
FIG. 10 shows another specific configuration of the sequencing part.
Figure 12:
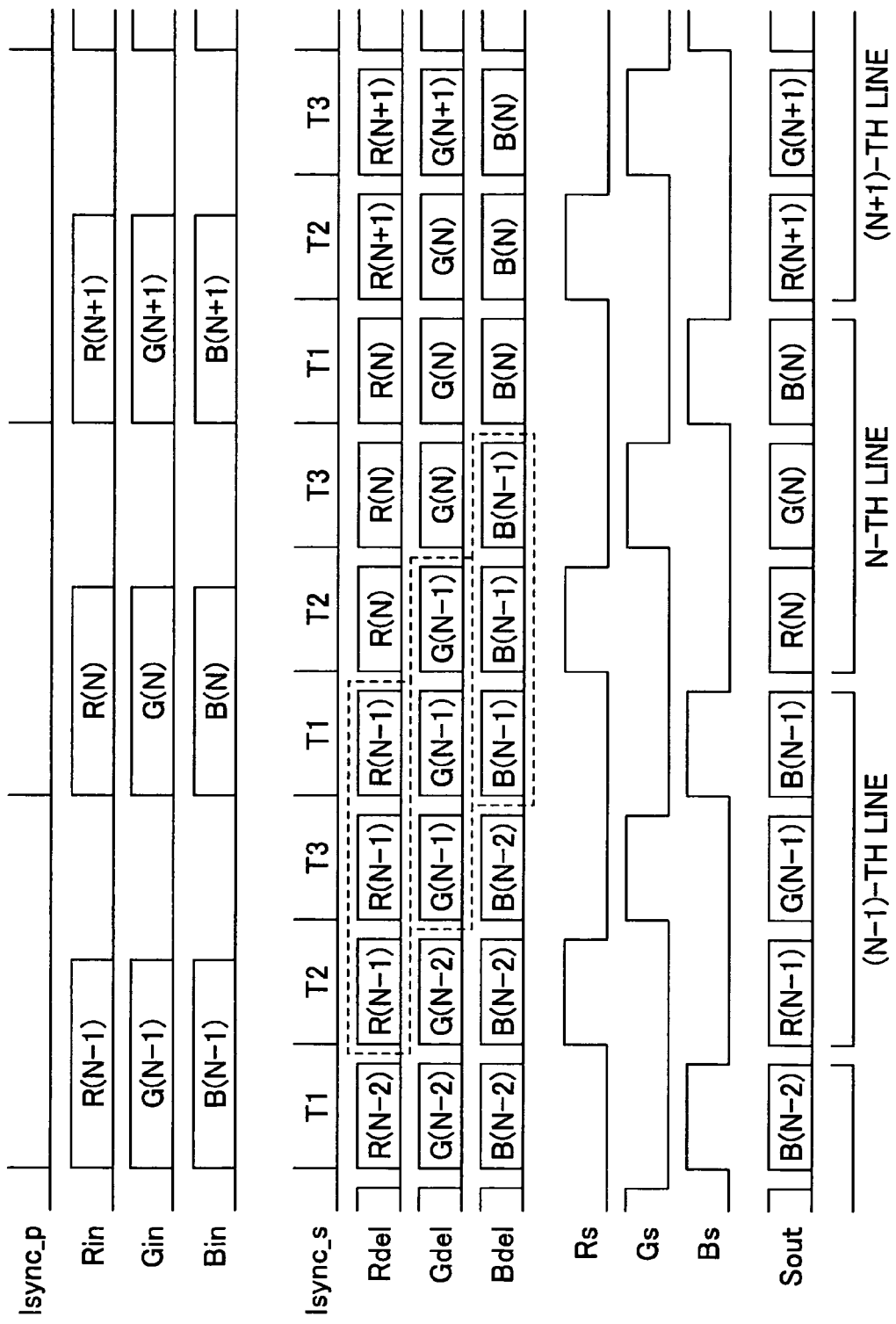
FIG. 12 shows a timing chart illustrating operation of the sequencing part of FIG. 10.

FIG. 10 shows another example of a configuration of the sequencing part 60. FIG. 12 shows operation timing in the sequencing part 60 of FIG. 10.

The sequencing part 60 of FIG. 10 is the same as that of FIG. 6 except in configuration that, from the data reading control part 63 to the data selecting part 64, respective control signals Rs, Gs and Bs are input. The respective control signals Rs, Gs and Bs are used to select from the respective delayed image data Rdel, Gdel and Bdel output from the RGB respective data delaying parts 62r, 62g and 62b, as the output Sout, in the data selecting part 64.

As shown in FIG. 12, lsync_p and lsync_s denote the respective main scanning synchronization signals applied before and after the data delaying parts 62r, 62g and 62b, and lsync_p has a period thrice a period of lsync_s, as shown. Every period of lsync_s, the line image data is output from the respective line memories 61r, 61g and 61b in parallel simultaneously, as shown.

However, as shown in FIG. 12, a combination of the output line image data is deferent in each period (line) of lsync_s, repeated as T1, T2, T3, T1, T2, T3, . . . . In FIG. 12, as shown, in the line of period T1, data of the immediately preceding line with respect to the input image data in the same manner is output for R, G and B. In the line of period T2, the same line data is output for R, while the immediately preceding line data is output for G and B, with respect to the input image data. In the line of period T3, the same line data is output for R and G, while the immediately preceding line data is output for B, with respect to the input image data.

The data selecting part 64 outputs the image signal of any one of R, G and B corresponding to Rs, Gs or Bs received from the data reading control part 63, from among the outputs Rdel, Gdel and Bdel from the RGB respective data delaying parts 62r, 62g and 62b. When Rs, Gs and Bs are generated in the timing of FIG. 12, Rdel is output in the line of period T2, Gdel is output in the line of period T3, and Bdel is output in the line of period T1, as shown.

Figure 11:
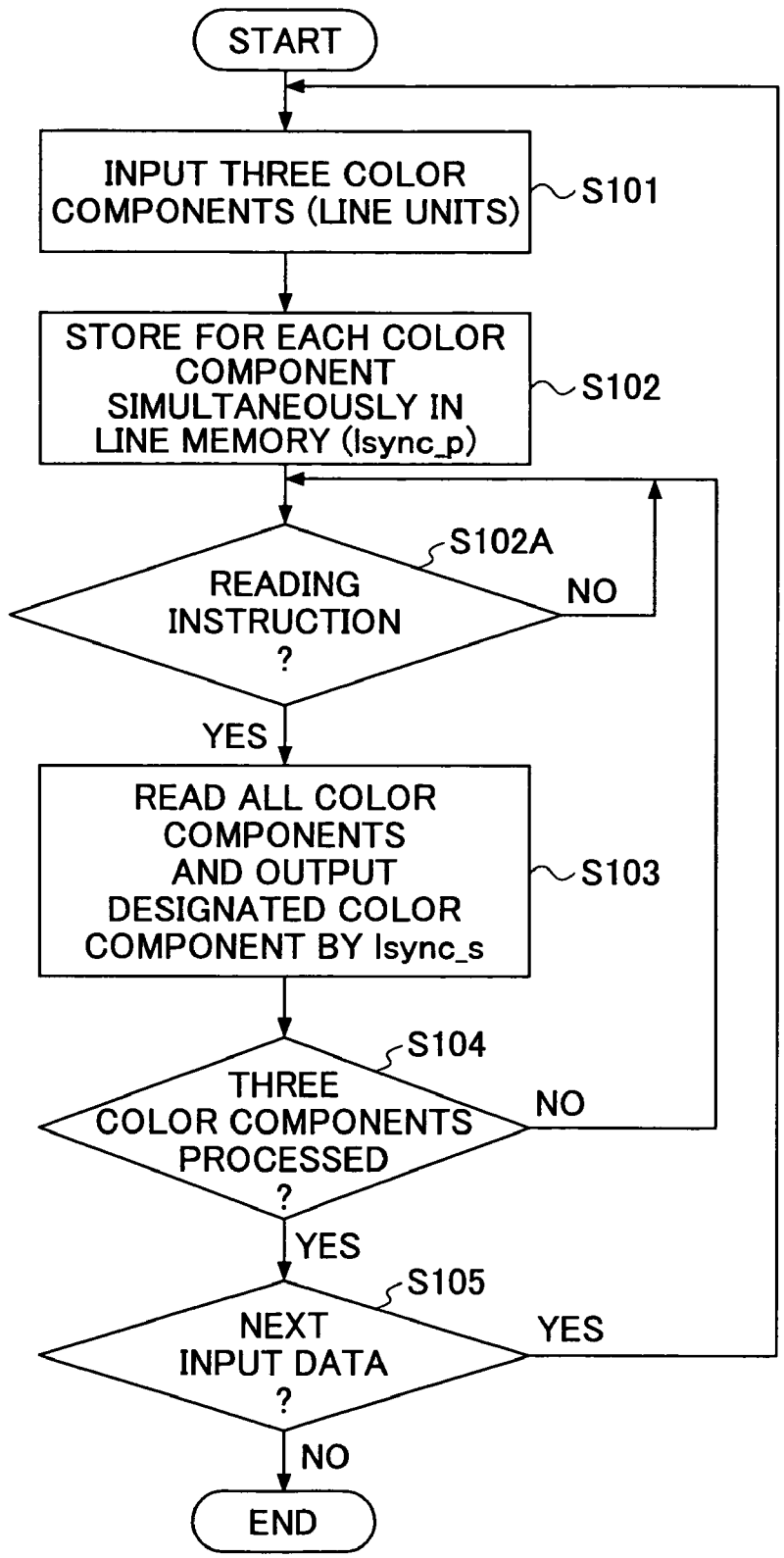
FIG. 11 shows a flow chart illustrating operation of the sequencing part of FIG. 10.

FIG. 11 shows a flow chart illustrating an operation flow of the sequencing part 60 described with reference to FIGS. 12 through 14.

In Step S101, the RGB three color component image data is input in synchronization with the main scanning synchronization signal lsync_p. In Step S102, the image data is then stored in the respective line memories 61r, 61g and 61b by the data delaying parts 62r, 62g and 62b, respectively.

When the reading signal is generated by the data reading control part 63 in Step S102A, the image data of the respective color components stored in the line memories 61r, 61g and 61b are read in synchronization with the thrice main scanning synchronization signal lsync_s therefrom in parallel simultaneously in Step S103. Therefrom, the image data of the color component designated by the designation signal Rs, Gs or Bs from the reading control part 63 is selected by the data selecting part 64, and is output as Sout in Step S103. This operation is repeated for the RGB color components (Yes in Step S104), and after that, the same processing (Steps S101 through S104) is carried out on next input image data.

Figure 13:
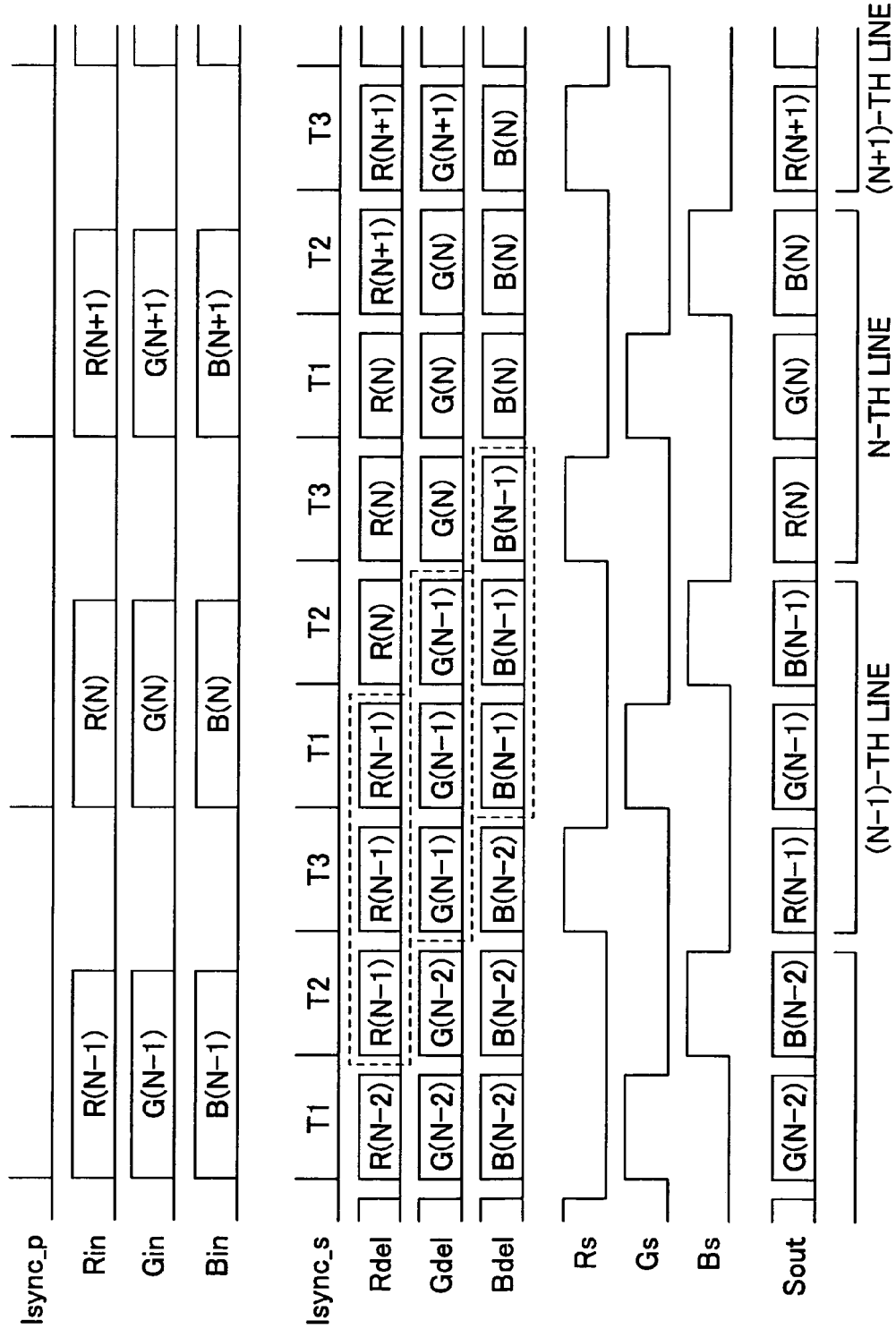
FIG. 13 shows a timing chart illustrating operation of the sequencing part of FIG. 10 different in Rs, Gs and Bs generating timing from that of FIG. 12.
Figure 14:
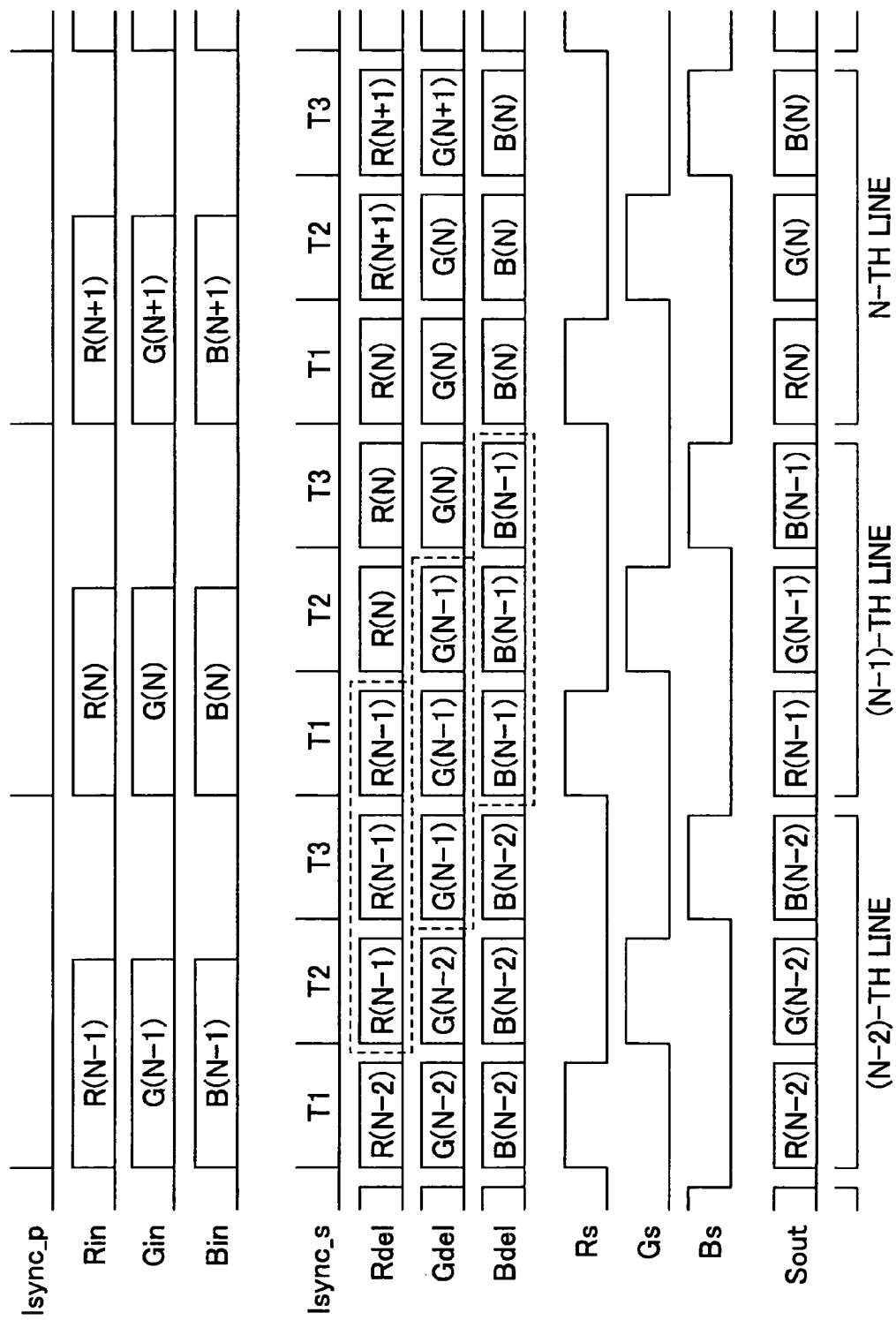
FIG. 14 shows a timing chart illustrating operation of the sequencing part of FIG. 10 different in Rs, Gs and Bs generating timing from that of FIGS. 12 and 13.

As a result, as shown in any one of FIG. 12 through 14, the respective color component image data input in parallel simultaneously is output in sequence every line every color component at the thrice rate.

FIG. 13 shows operation timing of the sequencing part 60 different in the generation timing of the color component designating signals Rs, Gs and Bs from that of FIG. 12. Specifically, in this example, Rdel is output in the period T3 line, Gdel is output in the period T1 line, and Bdel is output in the period T2 line.

FIG. 14 shows operation timing of the sequencing part 60 different in the generation timing of the color component designating signals Rs, Gs and Bs from those of FIGS. 12 and 13. Specifically, in this example, Rdel is output in the period T1 line, Gdel is output in the period T2 line, and Bdel is output in the period T3 line.

In the timing charts of FIGS. 12, 13 and 14, from the same color line read image data (including a set of the RGB respective color component image data), the sequencing part 60 outputs the image data in the order of R, G and then B. That is, in a case of switching among Rs, Gs and Bs every line, the RGB respective color component line image data of the same color line is output from the sequencing part 60 in the order of R, G and then B.

In the above description, an example of the order of R, G and then B is mentioned. However, the order in the line sequential signal can be determined in any other manner.

Figure 15:
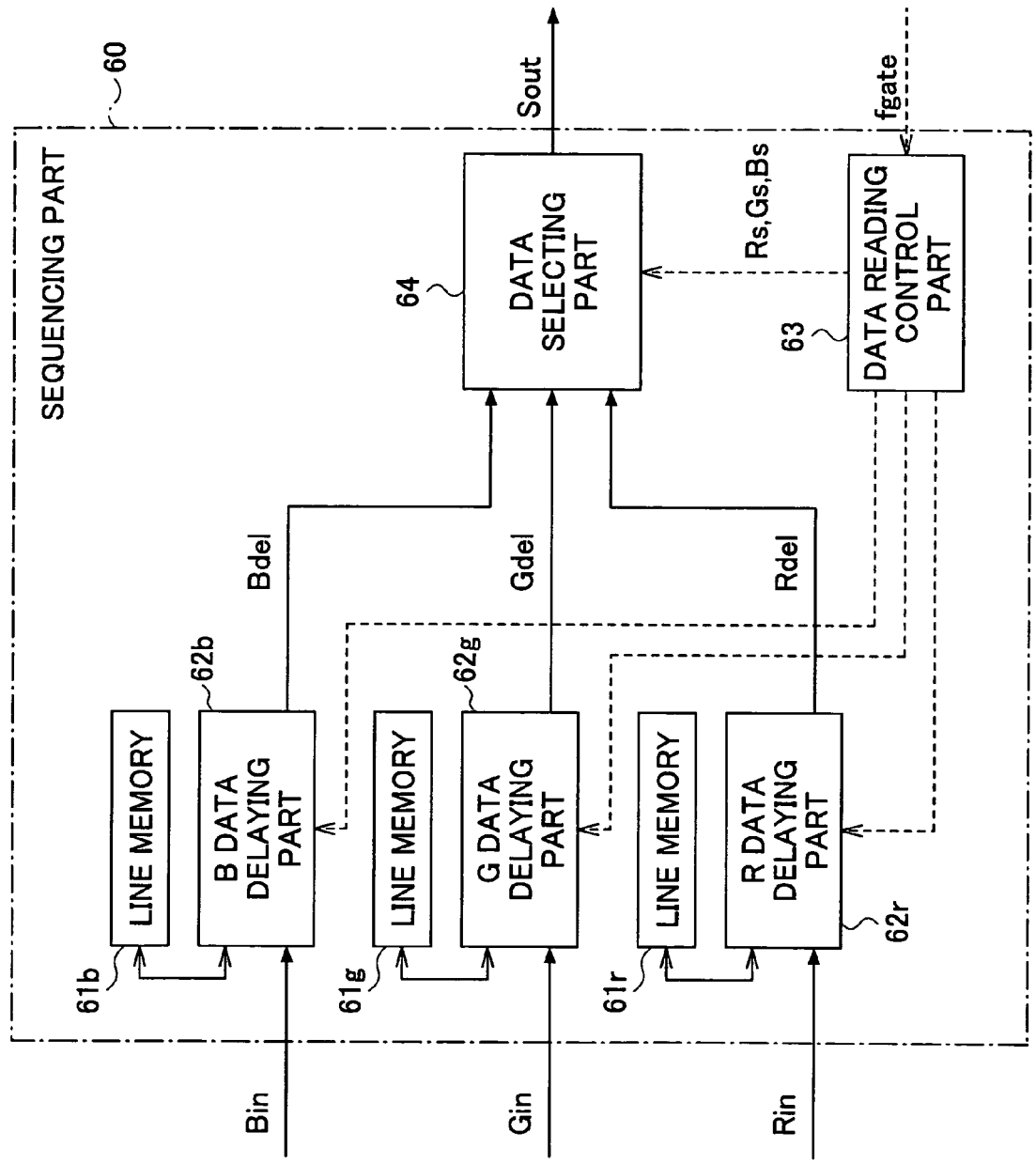
FIG. 15 shows further another specific configuration of the sequencing part.
Figure 17:
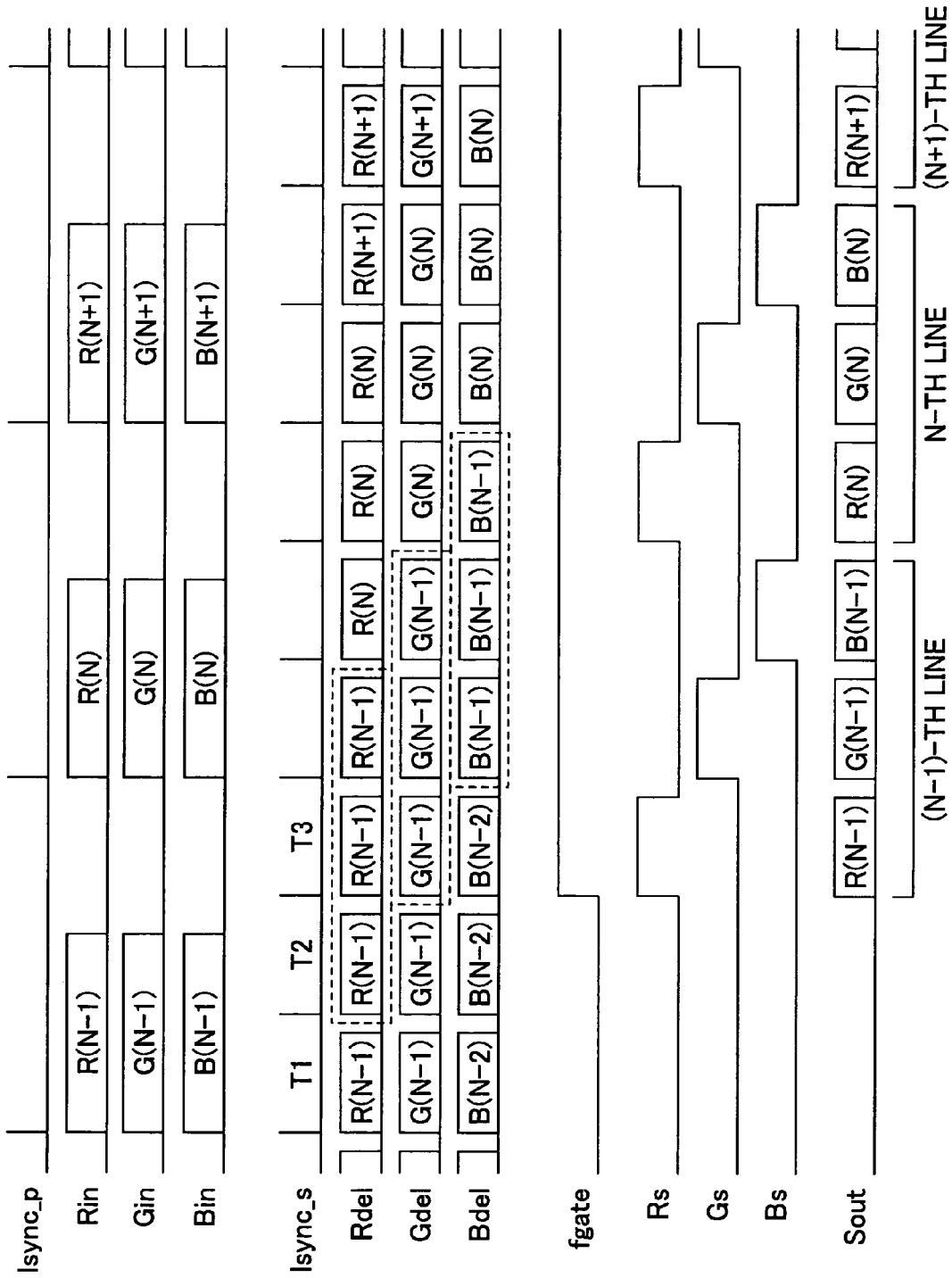
FIG. 17 shows a timing chart illustrating operation of the sequencing part of FIG. 15.

FIG. 15 shows another configuration of the sequencing part 60 than those of FIGS. 6 and 10. FIG. 17 shows a timing chart showing operation timing of this sequencing part 60.

The sequencing part 60 of FIG. 15 is the same as that of FIG. 10 in configuration except that a gate signal fgate is input to the data reading control part 63.

In FIG. 17, the gate signal fgate designates valid image lines. The color component designating signals Rs, Gs and Bs are generated by the data reading control part 63 based on the gate signal fgate. That is, only during an asserted period corresponding to the valid image lines defined by the gate signal fgate, the signals Rs, Bs and Gs are asserted in sequence in the stated order. The other timing operation is the same as that of the sequencing part 60 of FIG. 10 described above with reference to FIGS. 12 through 14.

In the above description, an example of the order of R, G and then B is mentioned. However, the order in the line sequential signal can be determined in any other manner.

Figure 16:
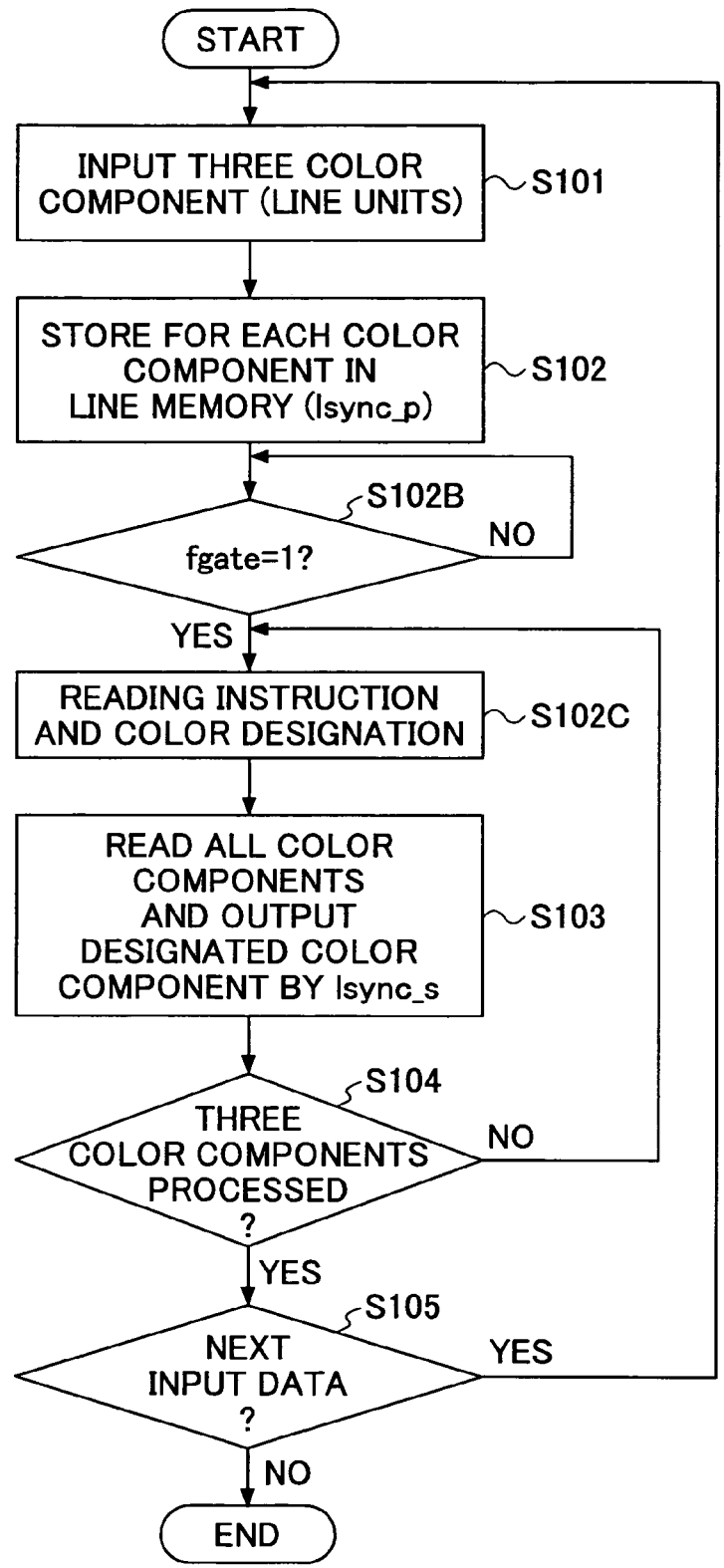
FIG. 16 shows a flow chart illustrating operation of the sequencing part of FIG. 15.

FIG. 16 shows a flow chart illustrating an operation flow of the sequencing part 60 described with reference to FIGS. 15 and 17.

In Step S101, the RGB three color component image data is input in synchronization with the main scanning synchronization signal lsync_p. In Step S102, the image data is then stored in the respective line memories 61r, 61g and 61b by the data delaying parts 62r, 62g and 62b, respectively.

When the asserting gate signal fgate is received by the data reading control part 63, which then generates the reading signal in Step S102B, the image data of the respective color components stored in the line memories 61r, 61g and 61b are read in synchronization with the thrice main scanning synchronization signal lsync_s therefrom in parallel simultaneously in Steps S102C and S103. Therefrom, the image data of the color component designated by the designation signal Rs, Gs or Bs from the reading control part 63 in Step S102C is selected by the data selecting part 64, and is output in Step S103. This operation is repeated for the RGB color components (Yes in Step S104), and then, the same processing (Steps S101 through S104) is carried out on next input image data, as long as the asserting gate signal fgate is received (Yes in Step S102B).

As a result, as shown in any one of FIG. 17, the respective color component image data input in parallel simultaneously is output in sequence every line every color component at the thrice rate.

Figure 18:
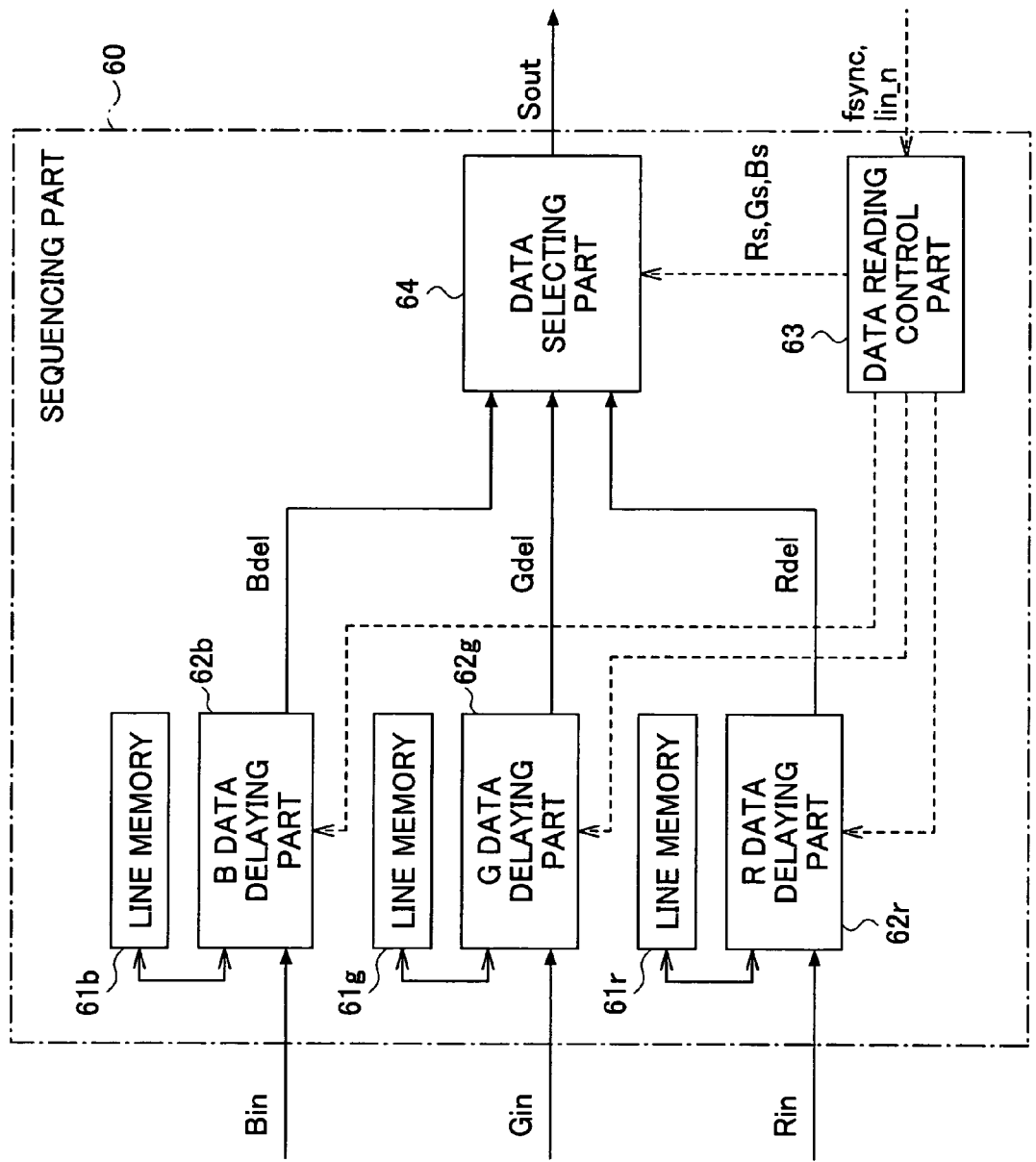
FIG. 18 shows further another specific configuration of the sequencing part.
Figure 20:
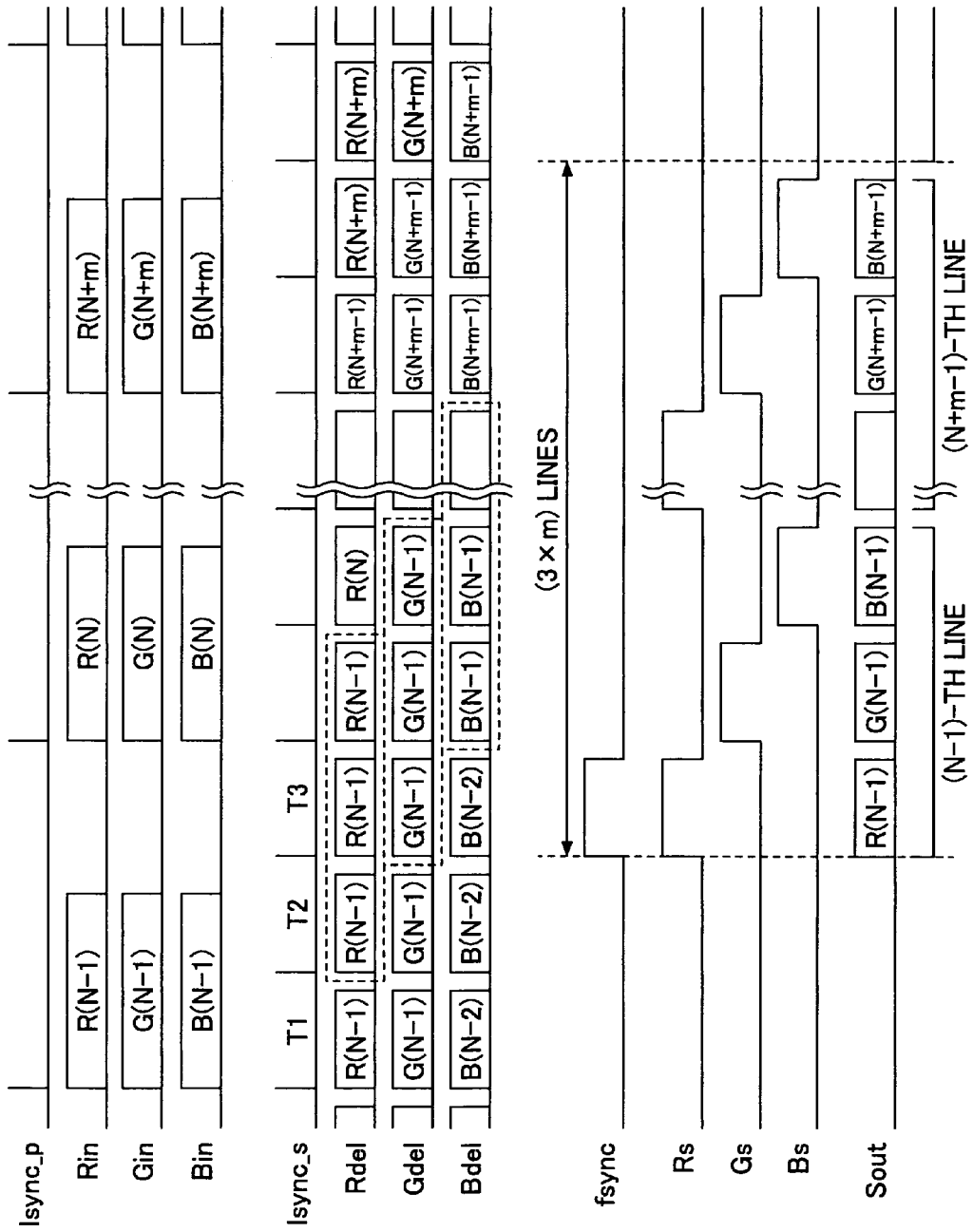
FIG. 20 shows a timing chart illustrating operation of the sequencing part of FIG. 18.

FIG. 18 shows another configuration of the sequencing part 60 than those of FIGS. 6, 10 and 15. FIG. 20 shows a timing chart showing operation timing of this sequencing part 60.

The sequencing part 60 of FIG. 18 is the same as that of FIG. 10 in configuration except that a valid line signal fsync and a valid line number signal line_n are input to the data reading control part 63.

In FIG. 20, the valid line signal fsync designates a beginning of the valid image lines and the valid line number signal line_n designates the number of the valid image lines. The color component designating signals Rs, Gs and Bs are generated by the data reading control part 63 based on the valid line signal fsync and the valid line number signal line_n. That is, only during an asserted period corresponding to the valid image lines started from the line designed by the valid line signal fsync for the number of lines designated by the valid line number signal line_n, the signals Rs, Bs and Gs are asserted in sequence in the stated order. The other timing operation is the same as that of the sequencing part 60 of FIG. 10 described above with reference to FIGS. 12 through 14.

In the above description, an example of the order of R, G and then B is mentioned. However, the order in the line sequential signal can be determined in any other manner.

Figure 19:
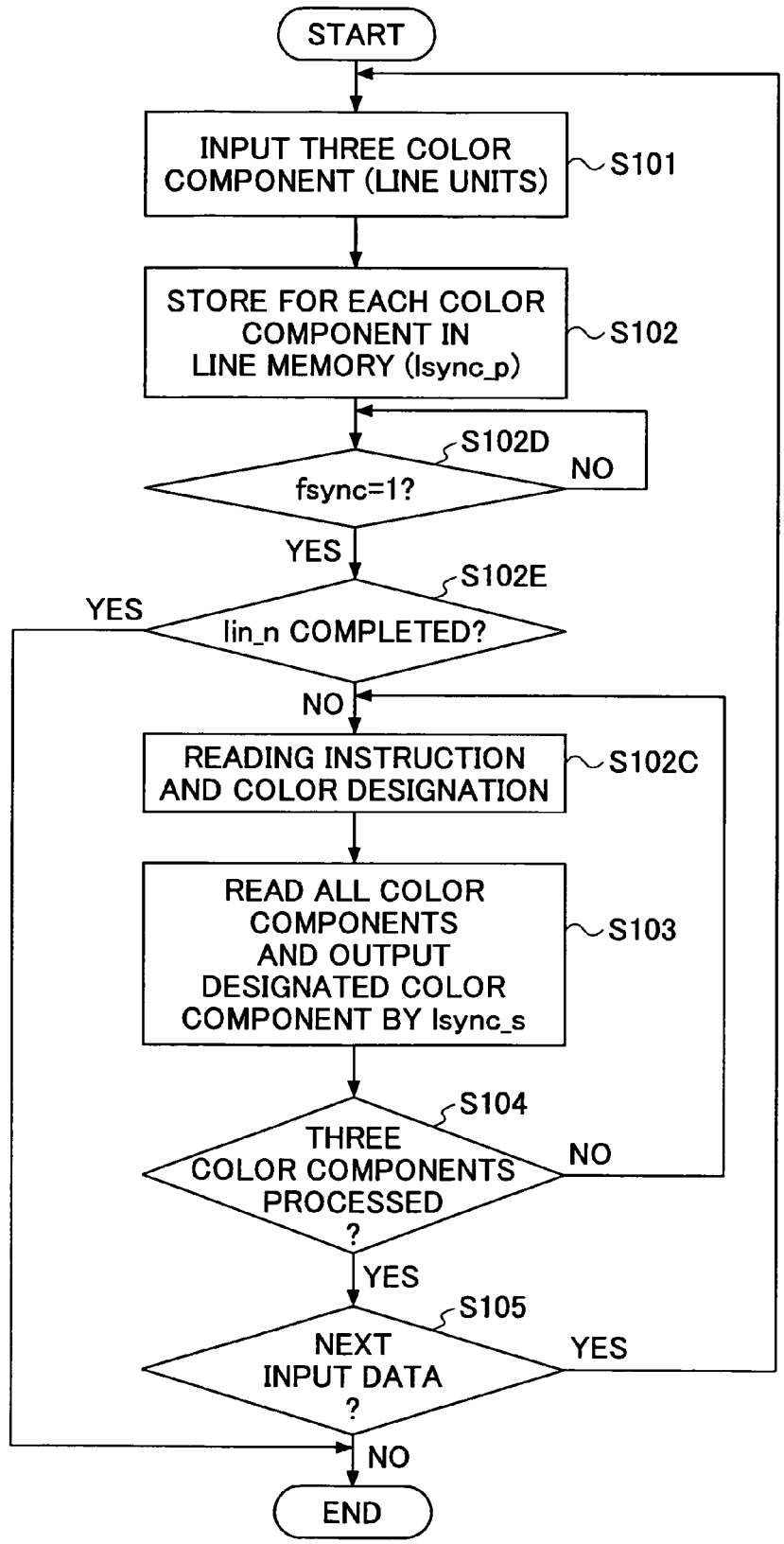
FIG. 19 shows a flow chart illustrating operation of the sequencing part of FIG. 18.

FIG. 19 shows a flow chart illustrating an operation flow of the sequencing part 60 described with reference to FIGS. 18 and 20.

In Step S101, the RGB three color component image data is input in synchronization with the main scanning synchronization signal lsync_p. In Step S102, the image data is then stored in the respective line memories 61*r*, 61*g* and 61*b* by the data delaying parts 62*r*, 62*g* and 62*b*, respectively.

When the valid line signal fsync is received by the data reading control part 63, which then generates the reading signal in Step S102B, the image data of the respective color components stored in the line memories 61*r*, 61*g* and 61*b* are read in synchronization with the thrice main scanning synchronization signal lsync_s therefrom in parallel simultaneously in Steps S102C and S103. Therefrom, the image data of the color component designated by the designation signal Rs, Gs or Bs generated from the reading control part 63 in Step S102C in the predetermined sequence is accordingly selected by the data selecting part 64, and is output in Step S103. This operation is repeated for the RGB color components (Yes in Step S104), and then, the same processing (Steps S101 through S104) is carried out on next input image data, for the valid lines started from the line designed by the valid line signal fsync for the number of lines designated by the valid line number signal line_n (No in Step S102E).

As a result, as shown in any one of FIG. 17, the respective color component image data input in parallel simultaneously is output in sequence every line every color component at the thrice rate.

Further, the present invention is not limited to the above-described embodiment, and variations and modifications may be made without departing from the basic concept of the present invention claimed below.

The present application is based on Japanese Priority Applications Nos. 2005-162298 and 2006-132708, filed on Jun. 2, 2005 and May 11, 2006, respectively, the entire contents of which are hereby incorporated herein by reference.

What is claimed is:

1. An image reading apparatus comprising:
   an image signal generating part reading a plurality of color components of image data in parallel from an original, and generating corresponding image signals for the respective color components in parallel;
   an image processing part carrying out predetermined image processing on the image signal for each of the plurality of color components, one by one in sequence; and
   a signal processing part outputting one by one in sequence for each color component the respective color components of the image signals thus generated by the image signal generating part to the image processing part.

2. The image reading apparatus as claimed in claim 1, wherein:
   said image signal processing part comprises an analog signal processing part; and
   said image processing part comprises a digital signal processing part.

3. The image reading apparatus as claimed in claim 2, wherein:
   said image signal generating part further comprises a color CCD receiving light of said plurality of color components at once, and generating corresponding electric signals in parallel; and
   said analog signal processing part carries out sampling, offset adjustment and gain adjustment on said plurality of color components of the electric signals simultaneously in parallel.

4. The image reading apparatus as claimed in claim 1, wherein:
   said image processing part comprises a shading processing part carrying out shading correction on the image data of the respective color components; a γ correcting part carrying out γ correction on the same; and a filter processing part carrying out filter processing on the same.

5. The image reading apparatus as claimed in claim 1, wherein:
   said signal processing part outputs line image data of a single color component for each line, according to a given signal designating the output color component.

6. The image reading apparatus as claimed in claim 1, wherein:
   said signal processing part outputs line image data of a single color component for each line in a predetermined sequence during a valid period designated by a given signal designating the valid period of image data.

7. The image reading apparatus as claimed in claim 1, wherein:
   said signal processing part outputs line image data of a single color component for each line in a predetermined sequence according to a signal designating a beginning of valid lines and a signal designating the number of the valid lines.

8. The image reading apparatus as claimed in claim 1, further comprising:
   an image forming part forming an image on a predetermined recording medium based on the image data having undergone the processing by the image processing part; and
   a communication part transmitting, via a communication line, the image data having undergone the processing by the image processing part.

9. The image reading apparatus as claimed in claim 1, wherein:
   in said signal processing part, with respect to a frequency of a liming control signal controlling timing of the image signal input from the image signal generating part, a frequency of a timing control signal controlling timing of the image signal output to the image processing part is increased by a predetermined multiplying factor.

10. The image reading apparatus as claimed in claim 1, wherein the color components include at least Red, Blue, and Green components.

11. The image reading apparatus as claimed in claim 1, wherein the signal processing part is configured to receive the image signals for the respective color components generated in parallel by the image signal generating part, and to embed the image signals for the respective color components into a single successive series of serial image data in a time-sharing manner.

12. The image reading apparatus as claimed in claim 11, wherein the signal processing part includes
    a plurality of data delaying parts corresponding to each of the color components, respectively, configured to store the image signals for the respective color components generated in parallel by the image signal generating part in response to reading control signals, and a data selecting part connected to each of the data delaying parts and configured to output image data received from a selected one of the plurality data delaying parts in based on a selection control signal.

13. The image reading apparatus as claimed in claim 12, wherein the signal processing part further includes a data reading control part configured to generate the reading and selection control signals.

* * * * *